United States Patent
Saito et al.

(10) Patent No.: US 7,533,842 B2
(45) Date of Patent: May 19, 2009

(54) WEBBING RETRACTOR

(75) Inventors: Takuhiro Saito, Niwa-gun (JP); Katsuki Asagiri, Niwa-gun (JP); Shinji Mori, Niwa-gun (JP); Tomonori Kimura, Niwa-gun (JP)

(73) Assignee: Kabushiki Kaisha Tokai-Rika-Denki-Seisakusho, Aichi (JP)

( * ) Notice: Subject to any disclaimer, the term of this patent is extended or adjusted under 35 U.S.C. 154(b) by 159 days.

(21) Appl. No.: 10/594,749

(22) PCT Filed: Mar. 31, 2005

(86) PCT No.: PCT/JP2005/006247

§ 371 (c)(1),
(2), (4) Date: Jun. 1, 2007

(87) PCT Pub. No.: WO2005/095164

PCT Pub. Date: Oct. 13, 2005

(65) Prior Publication Data

US 2007/0284870 A1  Dec. 13, 2007

(30) Foreign Application Priority Data

Apr. 1, 2004  (JP) .............................. 2004-109313

(51) Int. Cl.
*B60R 22/48* (2006.01)
*B60R 22/46* (2006.01)

(52) U.S. Cl. .................. 242/390.9; 242/382; 242/390.8; 242/381.1; 242/374; 464/41; 192/56.1; 280/806

(58) Field of Classification Search ............. 242/381.1, 242/382, 390.8, 374, 390.9; 280/806; 464/41; 192/56.1

See application file for complete search history.

(56) References Cited

U.S. PATENT DOCUMENTS 2,637,987 A  *  5/1953  Hill et al. ...................... 464/37

(Continued)

FOREIGN PATENT DOCUMENTS

EP  1 382 498 A2  1/2004

(Continued)

OTHER PUBLICATIONS

European Search Report dated Nov. 12, 2008 issued in corresponding European Patent Application No. 05 72 7332.

*Primary Examiner*—Peter M Cuomo
*Assistant Examiner*—Stefan Kruer
(74) *Attorney, Agent, or Firm*—Roberts Mlotkowski Safran & Cole, P.C.; Thomas W. Cole

(57) ABSTRACT

A clutch 100 of the present webbing retractor has a gear wheel 116 and spring claws 182, and has peripheral direction load receiving portions 120 at the gear wheel 116, and load from the spring claws 182 is applied along a peripheral direction via the peripheral direction load receiving portions 120. Therefore, compactness and weight reduction of the clutch 100 can be aimed for. Further, the clutch 100 has a ring 176, and the ring 176 integrally has a cover portion 178 holding respective clutch structural members at predetermined assembly positions, and the spring claws 182, and is held integrally with a rotor 124 by elastic forces of the spring claws 182. In this way, the respective clutch structural members can be temporarily held (sub-assembled) integrally.

26 Claims, 11 Drawing Sheets

U.S. PATENT DOCUMENTS

| | | | |
|---|---|---|---|
| 5,553,802 A * | 9/1996 | Park et al. | 242/372 |
| 5,601,491 A * | 2/1997 | Chan et al. | 464/37 |
| 2004/0075008 A1* | 4/2004 | Mori et al. | 242/390.8 |
| 2004/0075009 A1* | 4/2004 | Mori et al. | 242/390.8 |
| 2005/0239556 A1* | 10/2005 | Huthmacher et al. | 464/41 |
| 2006/0249613 A1* | 11/2006 | Scherzinger et al. | 242/374 |
| 2008/0252060 A1* | 10/2008 | Saito et al. | 280/806 |

FOREIGN PATENT DOCUMENTS

| | | |
|---|---|---|
| EP | 1 382 498 A3 | 1/2004 |
| JP | 2001-130376 A | 5/2001 |
| JP | 2001-347923 A | 12/2001 |
| JP | 2004-42789 A | 2/2004 |

\* cited by examiner

WEBBING RETRACTOR

TECHNICAL FIELD

The present invention relates to a webbing retractor, and in particular, to a webbing retractor which can take-up webbing by rotating a take-up shaft by a motor.

BACKGROUND ART

A seat belt device for restraining a vehicle occupant is equipped with a webbing retractor. Among webbing retractors, there are those provided with a tension reducer which is for mitigating or eliminating an excessive constricting sensation at the time the webbing is applied, or a pretensioner mechanism which, by taking-up a predetermined amount of a webbing onto a take-up shaft when the vehicle is in a state of rapid deceleration or the like, eliminates the slight looseness called "slack" or the like and increases the force restraining the body of the vehicle occupant by the webbing and holds the body of the vehicle occupant even more reliably. Further, a so-called motorized retractor of a structure which carries out the above-described respective functions by a motor is known (as examples, refer to Patent Document 1 and Patent Document 2).

In this type of motorized retractor, for example, not only can the functions of a tension reducer and a pretensioner be exhibited as described above, but assisting of the taking-up and the pulling-out of the webbing at usual times of application of the webbing and the like are also possible, which is extremely advantageous.

In particular, in recent years, a structure has been conceived of in which, in a motorized retractor as described above, the distance to another vehicle or an obstacle in front is detected by a forward monitoring device such as a distance sensor or the like, and when the distance to the vehicle or obstacle in front becomes less than a given value, a motor is operated, and the take-up shaft is rotated in the take-up direction by the rotational force of the motor. In such a motorized retractor, in order to prevent the rotation from the take-up shaft side from being transferred to the motor, a clutch is interposed between the output shaft of the motor and the take-up shaft, and only rotation from the motor output shaft side is transferred to the take-up shaft by the clutch.

In such a motorized retractor, there are demands for compactness and weight reduction, a reduction in the manufacturing cost, and the like. Compactness and weight reduction, an improvement in the assemblability, and the like are required also of the clutch as described above.

Patent Document 1: Japanese Patent Application Laid-Open (JP-A) No. 2001-130376

Patent Document 2: Japanese Patent Application Laid-Open (JP-A) No. 2001-347923

DISCLOSURE OF THE INVENTION

Problems to be Solved by the Invention

In view of the above-described circumstances, the present invention provides a webbing retractor in which not only is it possible for only rotation from a motor side to be transferred to a take-up shaft by a clutch, but also, compactness and weight reduction of the clutch can be aimed for, and the assemblability is improved.

Means for Solving the Problems

A first aspect of the present invention is a webbing retractor including: a take-up shaft on which webbing for restraining a vehicle occupant is wound so as to be able to be taken-up thereon and pulled-out therefrom, a motor, and a clutch which is mechanically interposed between the motor and the take-up shaft, and transfers rotation of the motor to the take-up shaft and rotates the take-up shaft, and cuts-off transfer of rotation generated at the take-up shaft side and prevents the rotation from being transferred to the motor, wherein the clutch include: a gear wheel provided coaxially to the take-up shaft, and rotating due to rotation of the motor being transferred thereto; a rotor provided coaxially to the gear wheel; a lock bar provided at the rotor and usually held at a position of released engagement with the take-up shaft, and when the rotor rotates in a first direction around an axis, the lock bar engages the take-up shaft and transfers rotation of the rotor to the take-up shaft, and when the rotor rotates in a second direction around the axis, the lock bar is moved to and held at the position of released engagement; and a spring claw provided between the gear wheel and the rotor along a peripheral direction, and transferring rotation of the gear wheel to the rotor, and when load of greater than or equal to a predetermined value is applied to the rotor, the spring claw cuts-off transfer of the rotation by the load, and makes the gear wheel and the rotor able to run idly relatively, and the gear wheel has a peripheral direction load receiving portion which receives, along a peripheral direction, load applied from the spring claw.

The webbing retractor of the first aspect has the clutch which transfers the rotation of the motor to the take-up shaft. The clutch has the gear wheel which rotates due to rotation of the motor being transferred thereto, and the rotor which is provided coaxially to the gear wheel. A spring claw is provided between the gear wheel and the rotor along the peripheral direction thereof, and the rotation of the gear wheel is transferred to the rotor via the spring claw.

Further, the lock bar, which, by engaging with the take-up shaft, transfers rotation of the rotor in one direction around the axis (i.e., the first direction) to the take-up shaft, is provided at the rotor. The lock bar is usually held at the position of released engagement with the take-up shaft. Therefore, usually, the rotor and the take-up shaft can rotate relative to one another, and rotation which is generated at the take-up shaft side is prevented from being transferred to the motor.

Due to this structure, when a vehicle occupant seated in a seat of the vehicle pulls the webbing which is accommodated in the present webbing retractor, the webbing is pulled-out while the take-up shaft rotates. Due to the vehicle occupant placing the pulled-out webbing around his/her body and, for example, engaging a tongue plate provided at the webbing with a buckle device, the webbing can be applied to the body.

When the motor rotates, the gear wheel of the clutch is rotated in the first direction. The rotation of the gear wheel is transferred to the rotor via the spring claw, and the rotor is rotated in the first direction. When the rotor is rotated in the first direction, the lock bar provided at the rotor engages with the take-up shaft. In this way, the rotation of the rotor in the first direction is transferred to the take-up shaft via the lock bar, and the take-up shaft is rotated in the first direction.

In the state in which the take-up shaft and the rotor are connected by the lock bar as described above, when, for example, a load of greater than or equal to a predetermined value is applied to the take-up shaft from the webbing, load of greater than or equal to a predetermined value is applied to the rotor via the lock bar. When load of greater than or equal to a predetermined value is applied to the rotor, the spring claw cuts-off the transfer of the rotation between the gear wheel and the rotor by that load, and makes the both able to idly run relatively (a so-called "load limiter mechanism"). In this way, the take-up shaft, which is connected to the rotor via the lock bar, can be prevented from being rotated in the first direction by a force greater than needed by the driving force of the motor.

On the other hand, when the motor rotates reversely, the gear wheel of the clutch is rotated in the other direction around the axis (i.e., the second direction). The rotation of the gear wheel is transferred to the rotor via the spring claw, and the rotor is rotated in the second direction. When the rotor is rotated in the second direction, the lock bar provided at the rotor is moved to and held at the position of released engagement with the take-up shaft. In this way, the rotor and the take-up shaft are made able to rotate relatively again, and free rotation of the take-up shaft becomes possible.

In the clutch of this webbing retractor, the peripheral direction load receiving portion is provided at the gear wheel. At the time of transfer of rotational force between the gear wheel and the rotor, the load, which is applied from the spring claw to the gear wheel, is applied along the peripheral direction of the gear wheel via the peripheral direction load receiving portion. Accordingly, at the clutch, there is no need to predict a load applied from the spring claw along the radial direction of the gear wheel, at the aforementioned time of transfer of rotational force, and increase the rigidity of the gear wheel. In this way, the gear wheel can be molded to be thin-walled or can be molded of resin or the like, and compactness and weight reduction of the clutch can be aimed for.

A second aspect of the present invention is a webbing retractor including: a take-up shaft on which webbing for restraining a vehicle occupant is wound so as to be able to be taken-up thereon and pulled-out therefrom, a motor, and a clutch which is mechanically interposed between the motor and the take-up shaft, and transfers rotation of the motor to the take-up shaft and rotates the take-up shaft in the webbing take-up direction, and cuts-off transfer of rotation generated at the take-up shaft side and prevents the rotation from being transferred to the motor, wherein the clutch include: a case; a gear wheel provided coaxially to the take-up shaft, and rotating due to rotation of the motor being transferred thereto; a rotor provided coaxially to the gear wheel, and having external teeth at an outer peripheral portion; a slider which can move relative to the rotor within a predetermined range by being held at the case by frictional force; a lock bar provided at the rotor, and always urged in a direction of engaging with the take-up shaft, and usually held by the slider at a position of released engagement with the take-up shaft, and when the rotor rotates in the webbing take-up direction, the lock bar moves so as to move apart from the slider, and the holding is released, and the lock bar engages with the take-up shaft due to the urging force, and transfers rotation of the rotor to the take-up shaft, and permits relative rotation of the take-up shaft in the webbing take-up direction with respect to the rotor, and when the rotor rotates in the webbing pull-out direction, the lock bar moves so as to approach the slider, and is moved to and held at the position of released engagement by the slider; and a spring claw formed in a shape of a plate having elasticity, and provided between the gear wheel and the rotor along a peripheral direction, and a distal end portion of the spring claw engages with the external teeth of the rotor, and a proximal end portion of the spring claw engages with the gear wheel, and the spring claw transfers rotation of the gear wheel to the rotor, and when load of greater than or equal to a predetermined value is applied to the rotor, the spring claw elastically deforms due to the load, and pulls-out the distal end portion from the external teeth, and makes the gear wheel and the rotor able to run idly relatively, and the gear wheel has a peripheral direction load receiving portion which receives, along a peripheral direction, load applied from the spring claw.

The webbing retractor of the second aspect is provided with a clutch which transfers the rotation of the motor to the take-up shaft. The clutch has the gear wheel which rotates due to rotation of the motor being transferred thereto, and the rotor which is provided coaxially to the gear wheel and has external teeth at the outer peripheral portion thereof. The spring claw, which is formed in the shape of a plate having elasticity, is provided along the peripheral direction of the gear wheel and the rotor, between the gear wheel and the rotor. The spring claw may be structured such that the distal end portion of the spring claw engages with the external teeth of the rotor, and the proximal (base) end portion of the spring claw engages with the peripheral direction load receiving portion of the gear wheel, and the rotation of the gear wheel is transferred to the rotor via the spring claw.

Further, the lock bar, which, by engaging with the take-up shaft, transfers rotation of the rotor in the webbing take-up direction to the take-up shaft, is provided at the rotor. The lock bar is always urged in the direction of engaging with the take-up shaft, and is usually held at the position of released engagement with the take-up shaft by the slider. Therefore, usually, the rotor and the take-up shaft can rotate relative to one another, and rotation which is generated at the take-up shaft side is prevented from being transferred to the motor.

Due to this structure, when a vehicle occupant seated in a seat of the vehicle pulls the webbing which is accommodated in the present webbing retractor, the webbing is pulled-out while the take-up shaft rotates in the webbing pull-out direction. Due to the vehicle occupant placing the pulled-out webbing around his/her body and, for example, engaging a tongue plate provided at the webbing with a buckle device, the webbing can be applied to the body.

For example, if an obstacle exists in front of the vehicle while the vehicle is traveling and the interval between the vehicle and the obstacle (the distance from the vehicle to the obstacle) comes within a predetermined range, the motor rotates, and the gear wheel of the clutch is rotated in the webbing take-up direction. The rotation of the gear wheel is transferred to the proximal end portion of the spring claw from the peripheral direction load receiving portion, and is transferred from the distal end portion of the spring claw to the external teeth of the rotor, and the rotor is rotated in the webbing take-up direction. At this time, because the slider is held at the case by frictional force, the rotor moves relative to the slider within a predetermined range, and the lock bar provided at the rotor moves so as to move apart from the slider. The lock bar engages with the take-up shaft due to urging force, and the rotation of the rotor in the webbing take-up direction is transferred to the take-up shaft via the lock bar, and the take-up shaft is rotated in the webbing take-up direction. In this way, the webbing is taken-up onto the take-up shaft, and the slight looseness, so-called "slack", of the webbing in the applied state is eliminated, and the force of restraining the body of the vehicle occupant by the webbing can be increased.

In the state in which the "slack" is eliminated as described above, the body of the vehicle occupant becomes an obstruction, and the webbing can basically not be taken-up any further onto the take-up shaft. Therefore, load of greater than or equal to a predetermined value is applied to the take-up shaft from the webbing, and as a result, load of greater than or equal to a predetermined value is applied to the rotor via the lock bar. When load of greater than or equal to a predetermined value is applied to the rotor, the spring claw elastically deforms due to the load, and pulls-out the distal end portion thereof from the external teeth of the rotor, and makes the gear wheel and the rotor able to idly run relatively (a so-called "load limiter mechanism"). In this way, the take-up shaft, which is connected to the rotor via the lock bar, can be prevented from being rotated in the webbing take-up direction by a force which is greater than needed by the driving force of the motor, and the webbing can be prevented from binding the body of the vehicle occupant by a force which is greater than needed.

In this state, the lock bar permits relative rotation of the take-up shaft in the webbing take-up direction with respect to the rotor. Therefore, in the aforementioned state in which the "slack" is eliminated, if there becomes a state, for example, in which a vehicle collision is unavoidable, it is also possible for the take-up shaft to be forcibly rotated in the webbing take-up direction by a separate pretensioner device or the like. In this case, the force of restraining the body of the vehicle occupant by the webbing can be increased even more, and the harm to the vehicle occupant at the time of a vehicle collision can be kept to a minimum.

On the other hand, in the case in which the risk of a vehicle collision as described above is averted, the motor is rotated reversely, and the gear wheel of the clutch is rotated in the webbing pull-out direction. The rotation of the gear wheel is transferred to the external teeth of the rotor via the spring claw, and the rotor is rotated in the webbing pull-out direction. Because the slider is held at the case by frictional force, the rotor moves relative to the slider within a predetermined range, and the lock bar provided at the rotor moves so as to approach the slider. Therefore, the lock bar is, by the slider, moved to and held at the position of released engagement with the take-up shaft again. In this way, the rotor and the take-up shaft are made able to rotate relatively again, and free rotation of the take-up shaft becomes possible.

In the clutch of this webbing retractor, the peripheral direction load receiving portion is provided at the gear wheel. At the time of transfer of rotational force between the gear wheel and the rotor, the load, which is applied from the spring claw to the gear wheel, is applied along the peripheral direction of the gear wheel via the peripheral direction load receiving portion. Therefore, there is no need to predict a load applied from the spring claw along the radial direction of the gear wheel, at the aforementioned time of transfer of rotational force, and increase the rigidity of the gear wheel.

Moreover, when load of greater than or equal to a predetermined value is applied to the rotor, due to the spring claw elastically deforming, the spring claw pulls-out the distal end portion thereof from the external teeth of the rotor, and cuts-off the transfer of rotation between the gear wheel and the rotor. Namely, the operation of the above-described "load limiter mechanism" is carried out between the rotor and the spring claw. In this case as well, load along the radial direction is not applied to the gear wheel. Accordingly, from this point as well, there is no need to increase the rigidity of the gear wheel.

Accordingly, in the clutch of this webbing retractor, the gear wheel can be molded to be thin-walled or can be molded of resin or the like, and compactness and weight reduction of the clutch can be aimed for.

A third aspect of the present invention is a webbing retractor including a take-up shaft on which webbing for restraining a vehicle occupant is wound so as to be able to be taken-up thereon and pulled-out therefrom, a motor, and a clutch which is mechanically interposed between the motor and the take-up shaft, and transfers rotation of the motor to the take-up shaft and rotates the take-up shaft, and cuts-off transfer of rotation generated at the take-up shaft side and prevents the rotation from being transferred to the motor, wherein the clutch includes: a gear wheel provided coaxially to the take-up shaft, and rotating due to rotation of the motor being transferred thereto; a rotor provided coaxially to the gear wheel; a lock bar provided at the rotor and usually held at a position of released engagement with the take-up shaft, and when the rotor rotates in a first direction around an axis, the lock bar engages the take-up shaft and transfers rotation of the rotor to the take-up shaft, and when the rotor rotates in a second direction around the axis, the lock bar is moved to and held at the position of released engagement; and a ring having a cover portion disposed at an axial direction one side of the rotor and holding the gear wheel and the lock bar at predetermined assembly positions, and a spring claw formed integrally with the cover portion and provided between the gear wheel and the rotor and transferring rotation of the gear wheel to the rotor, and when load of greater than or equal to a predetermined value is applied to the rotor, the spring claw cuts-off transfer of the rotation by the load and makes both able to run idly relatively, and the ring is held at the rotor by elastic force of the spring claw.

The webbing retractor of the third aspect has the clutch which transfers the rotation of the motor to the take-up shaft. The clutch has the gear wheel which rotates due to rotation of the motor being transferred thereto, and the rotor which is provided coaxially to the gear wheel. The cover portion of the ring is disposed at an axial direction one side of the rotor, and the spring claw is formed integrally with the cover portion. The spring claw is provided between the gear wheel and the rotor, and the rotation of the gear wheel is transferred to the rotor via the spring claw.

The lock bar, which, by engaging with the take-up shaft, transfers rotation of the rotor in one direction around the axis (i.e., the first direction) to the take-up shaft, is provided at the rotor. The lock bar is usually held at the position of released engagement with the take-up shaft. Therefore, usually, the rotor and the take-up shaft can rotate relative to one another, and rotation which is generated at the take-up shaft side is prevented from being transferred to the motor.

Due to this structure, when a vehicle occupant seated in a seat of the vehicle pulls the webbing which is accommodated in the present webbing retractor, the webbing is pulled-out while the take-up shaft rotates. Due to the vehicle occupant placing the pulled-out webbing around his/her body and, for example, engaging a tongue plate provided at the webbing with a buckle device, the webbing can be applied to the body.

Further, when the motor rotates, the gear wheel of the clutch is rotated in the first direction. The rotation of the gear wheel is transferred to the rotor via the spring claw of the ring, and the rotor is rotated in the first direction. When the rotor is rotated in the first direction, the lock bar provided at the rotor engages with the take-up shaft. In this way, the rotation of the rotor in the first direction is transferred to the take-up shaft via the lock bar, and the take-up shaft is rotated in the first direction.

In the state in which the take-up shaft and the rotor are connected by the lock bar as described above, when, for example, a load of greater than or equal to a predetermined value is applied to the take-up shaft from the webbing, load of greater than or equal to a predetermined value is applied to the rotor via the lock bar. When load of greater than or equal to a predetermined value is applied to the rotor, the spring claw of the ring cuts-off the transfer of the rotation between the gear wheel and the rotor by that load, and makes the both able to idly run relatively (a load limiter mechanism). In this way, the take-up shaft, which is connected to the rotor via the lock bar, can be prevented from being rotated in the first direction by a force greater than needed by the driving force of the motor.

On the other hand, when the motor rotates reversely, the gear wheel of the clutch is rotated in the other direction around the axis (i.e., the second direction). The rotation of the gear wheel is transferred to the rotor via the spring claw of the ring, and the rotor is rotated in the second direction. When the rotor is rotated in the second direction, the lock bar provided at the rotor is moved to and held at the position of released engagement with the take-up shaft. In this way, the rotor and the take-up shaft are made able to rotate relatively again, and free rotation of the take-up shaft becomes possible.

In the clutch of this webbing retractor, the ring integrally has the cover portion, which holds the gear wheel and the lock bar at predetermined assembly positions, and the spring claw for the above-described "load limiter mechanism". Further, the ring is structured so as to be held at the rotor by the elastic force of the spring claw. Namely, in this clutch, by assembling the gear wheel and the lock bar at predetermined assembly positions and holding the ring at the rotor by the elastic force of the spring claw, the above-described respective clutch structural members can be temporarily held (sub-assembled) integrally. In this way, the assemblability at the time of assembling the above-described respective clutch structural members to the webbing retractor, or the like, is greatly improved.

A fourth aspect of the present invention is a webbing retractor including: a take-up shaft on which webbing for restraining a vehicle occupant is wound so as to be able to be taken-up thereon and pulled-out therefrom, a motor, and a clutch which is mechanically interposed between the motor and the take-up shaft, and transfers rotation of the motor to the take-up shaft and rotates the take-up shaft in the webbing take-up direction, and cuts-off transfer of rotation generated at the take-up shaft side and prevents the rotation from being transferred to the motor, wherein the clutch includes: a case; a gear wheel provided coaxially to the take-up shaft, and rotating due to rotation of the motor being transferred thereto; a rotor provided coaxially to the gear wheel; a slider which can move relative to the rotor within a predetermined range by being held at the case by frictional force; a lock bar provided at the rotor, and always urged in a direction of engaging with the take-up shaft, and usually held by the slider at a position of released engagement with the take-up shaft, and when the rotor rotates in the webbing take-up direction, the lock bar moves so as to move apart from the slider, and the holding is released, and the lock bar engages with the take-up shaft due to the urging force, and transfers rotation of the rotor to the take-up shaft, and permits relative rotation of the take-up shaft in the webbing take-up direction with respect to the rotor, and when the rotor rotates in the webbing pull-out direction, the lock bar moves so as to approach the slider, and is moved to and held at the position of released engagement by the slider; and a ring having a cover portion disposed at an axial direction one side of the rotor and holding the gear wheel, the slider and the lock bar at predetermined assembly positions, and a spring claw formed integrally with the cover portion and provided between the gear wheel and the rotor and transferring rotation of the gear wheel to the rotor, and when load of greater than or equal to a predetermined value is applied to the rotor, the spring claw cuts-off transfer of the rotation by the load and makes the gear wheel and the rotor able to run idly relatively, and the ring is held at the rotor by elastic force of the spring claw.

The webbing retractor of the fourth aspect has the clutch which transfers the rotation of the motor to the take-up shaft. The clutch has the gear wheel which rotates due to rotation of the motor being transferred thereto, and the rotor which is provided coaxially to the gear wheel. The cover portion of the ring is disposed at an axial direction one side of the rotor, and the spring claw is formed integrally with the cover portion. The spring claw is provided between the gear wheel and the rotor, and the rotation of the gear wheel is transferred to the rotor via the spring claw.

Further, the lock bar, which, by engaging with the take-up shaft, transfers rotation of the rotor in the webbing take-up direction to the take-up shaft, is provided at the rotor. The lock bar is always urged in the direction of engaging with the take-up shaft, and is usually held at the position of released engagement with the take-up shaft by the silder. Therefore, usually, the rotor and the take-up shaft can rotate relative to one another, and rotation which is generated at the take-up shaft side is prevented from being transferred to the motor.

Due to this structure, when a vehicle occupant seated in a seat of the vehicle pulls the webbing which is accommodated in the present webbing retractor, the webbing is pulled-out while the take-up shaft rotates in the webbing pull-out direction. Due to the vehicle occupant placing the pulled-out webbing around his/her body and, for example, engaging a tongue plate provided at the webbing with a buckle device, the webbing can be applied to the body.

For example, if an obstacle exists in front of the vehicle while the vehicle is traveling and the interval between the vehicle and the obstacle (the distance from the vehicle to the obstacle) comes within a predetermined range, the motor rotates, and the gear wheel of the clutch is rotated in the webbing take-up direction. The rotation of the gear wheel is transferred to the rotor via the spring claw of the ring, and the rotor is rotated in the webbing take-up direction. At this time, because the slider is held at the case by frictional force, the rotor moves relative to the slider within a predetermined range, and the lock bar provided at the rotor moves so as to move apart from the slider. The lock bar engages with the take-up shaft due to urging force, and the rotation of the rotor in the webbing take-up direction is transferred to the take-up shaft via the lock bar, and the take-up shaft is rotated in the webbing take-up direction. In this way, the webbing is taken-up onto the take-up shaft, and the slight looseness, so-called "slack", of the webbing in the applied state is eliminated, and the force of restraining the body of the vehicle occupant by the webbing can be increased.

In the aforementioned state in which the "slack" is eliminated, the body of the vehicle occupant becomes an obstruction, and the webbing can basically not be taken-up any further onto the take-up shaft. Therefore, load of greater than or equal to a predetermined value is applied to the take-up shaft from the webbing, and as a result, load of greater than or equal to a predetermined value is applied to the rotor via the lock bar. When load of greater than or equal to a predetermined value is applied to the rotor, the spring claw of the ring cuts-off the transfer of rotational force between the gear wheel and the rotor by that load, and makes the both able to idly run relatively (a load limiter mechanism). In this way, the take-up shaft, which is connected to the rotor via the lock bar, can be prevented from being rotated in the webbing take-up direction by a force which is greater than needed by the driving force of the motor, and the webbing can be prevented from binding the body of the vehicle occupant by a force which is greater than needed.

In this state, the lock bar permits relative rotation of the take-up shaft in the webbing take-up direction with respect to the rotor. Therefore, in the state in which the "slack" is eliminated as described above, if there becomes a state, for example, in which a vehicle collision is unavoidable, it is also possible for the take-up shaft to be forcibly rotated in the webbing take-up direction by a separate pretensioner device or the like. In this way, the force of restraining the body of the vehicle occupant by the webbing can be increased even more, and the harm to the vehicle occupant at the time of a vehicle collision can be kept to a minimum.

On the other hand, in the case in which the risk of a vehicle collision as described above is averted, the motor is rotated reversely, and the gear wheel of the clutch is rotated in the webbing pull-out direction. The rotation of the gear wheel is transferred to the rotor via the spring claw of the ring, and the rotor is rotated in the webbing pull-out direction. Because the slider is held at the case by frictional force, the rotor moves relative to the slider within a predetermined range, and the lock bar provided at the rotor moves so as to approach the slider. Therefore, the lock bar is, by the slider, moved to and held at the position of released engagement with the take-up shaft again. In this way, the rotor and the take-up shaft are made able to rotate relatively again, and free rotation of the take-up shaft becomes possible.

In the clutch of this webbing retractor, the ring integrally has the cover portion, which holds the gear wheel, the slider and the lock bar at predetermined assembly positions, and the spring claw for the above-described "load limiter mechanism". Further, the ring is structured so as to be held at the rotor by the elastic force of the spring claw. Namely, in this clutch, by assembling the gear wheel, the slider and the lock bar at predetermined assembly positions and holding the ring at the rotor by the elastic force of the spring claw, the above-described respective clutch structural members can be temporarily held (sub-assembled) integrally. In this way, the assemblability at the time of assembling the above-described respective clutch structural members to the webbing retractor, or the like, is greatly improved.

EFFECT OF THE INVENTION

As described above, the webbing retractor relating to the present invention not only can transfer only rotation from a motor side to a take-up shaft by a clutch, but also, can aim for compactness and weight reduction of the clutch, and improve the assemblability.

BEST MODES FOR CARRYING OUT THE INVENTION

Figure 10:
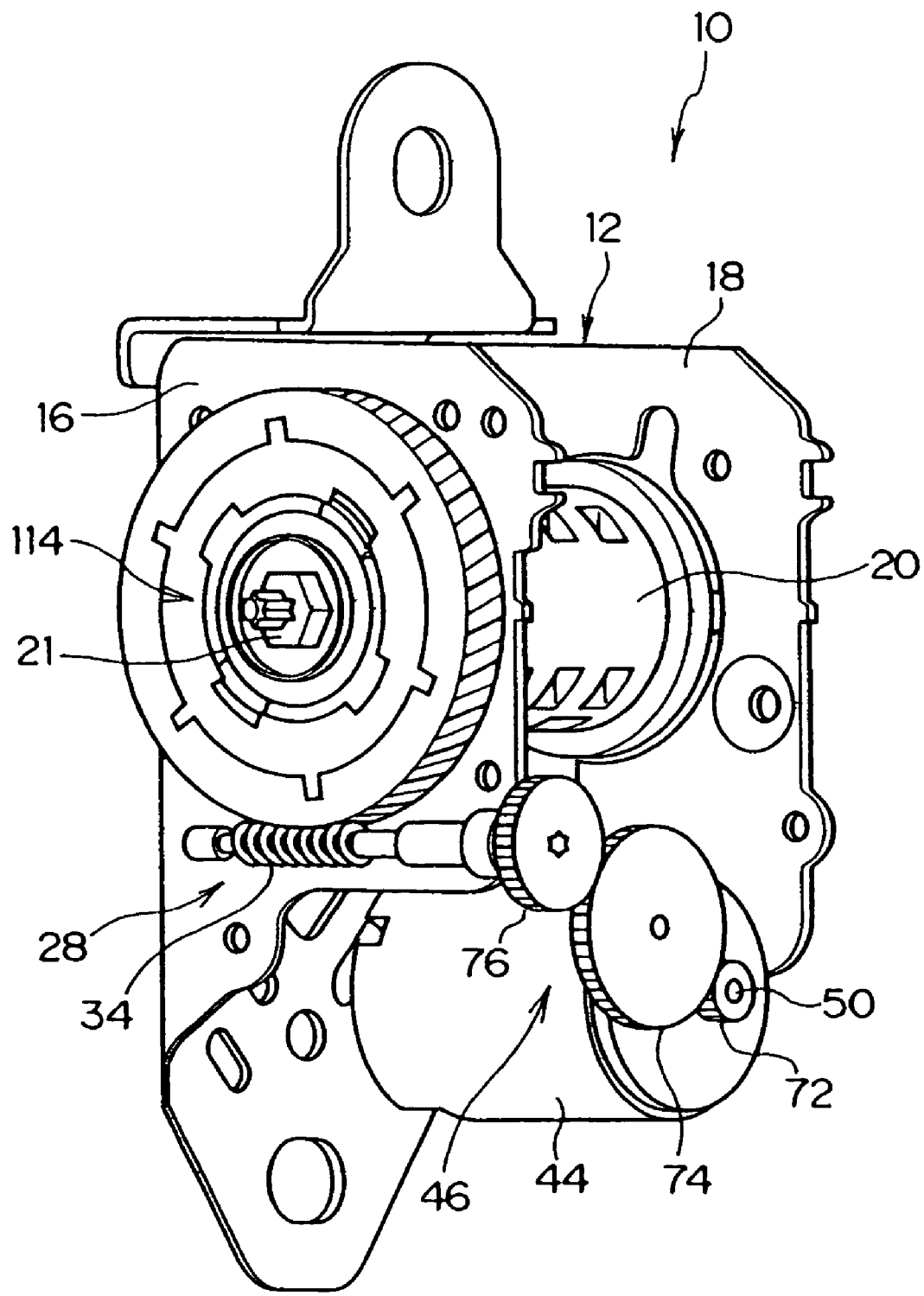
FIG. 10 is a perspective view showing the structures of main portions of the webbing retractor relating to the present embodiment.
Figure 11:
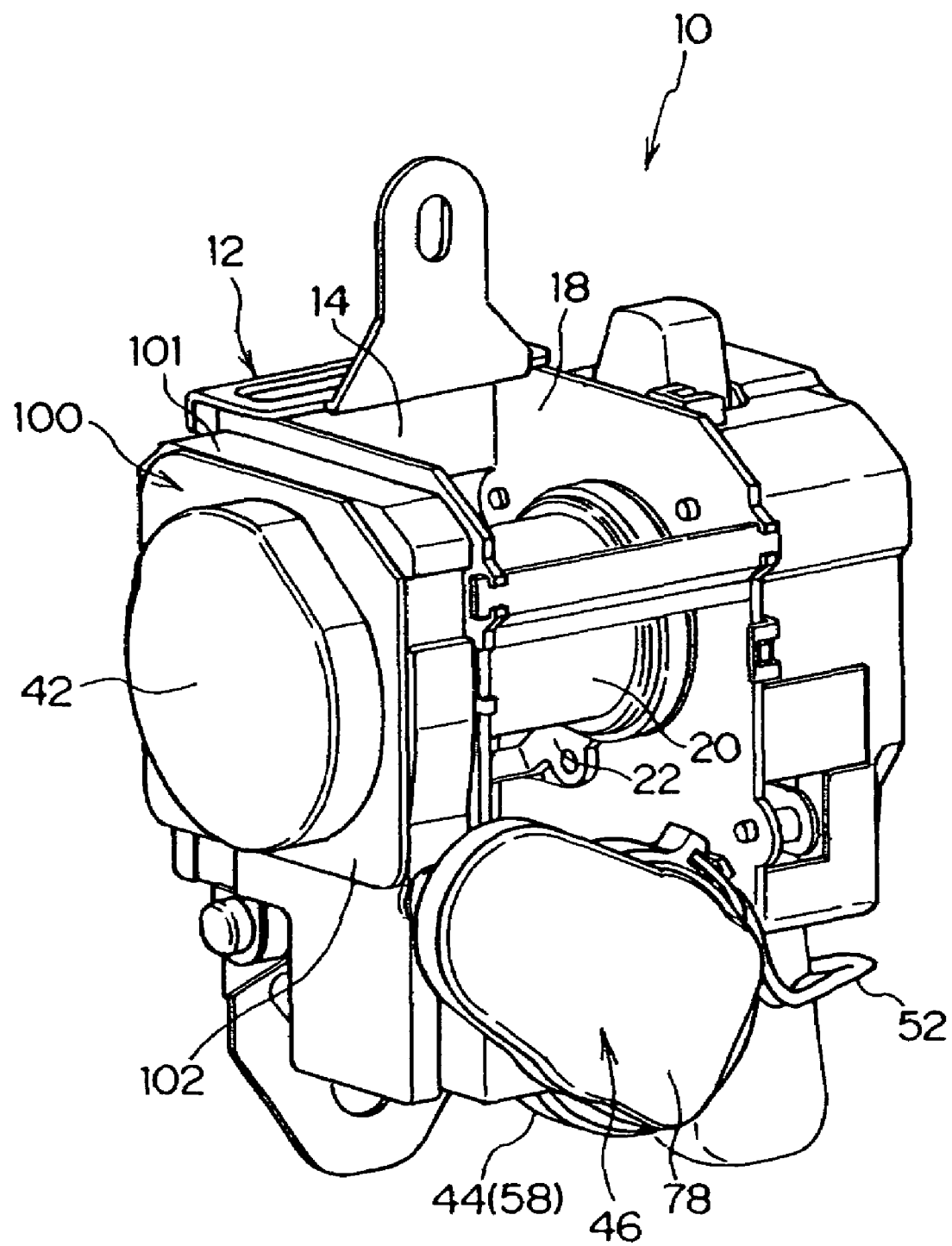
FIG. 11 is a perspective view showing the overall structure of the webbing retractor relating to the present embodiment.

The overall structure of a webbing retractor 10 relating to an embodiment of the present invention is shown in a perspective view in FIG. 11. Further, the structures of main portions of the webbing retractor 10 are shown in a perspective view in FIG. 10. Moreover, the overall structure of the webbing retractor 10 is shown in an exploded perspective view in FIG. 9.

The webbing retractor 10 has a frame 12. The frame 12 is structured by a substantially plate-shaped back plate 14, and a pair of a leg plate 16 and a leg plate 18 which extend integrally from both transverse direction ends of the back plate 14. Due to the back plate 14 being fixed to a vehicle body by an unillustrated fastening means such as bolts or the like, the back plate 14 is mounted to the vehicle body.

A take-up shaft 20, which is manufactured by die casting or the like, is rotatably disposed between the pair of the leg plate 16 and the leg plate 18 of the frame 12. The take-up shaft 20 is formed, on the whole, substantially in the shape of a bobbin, and a proximal end portion of webbing (not shown), which is formed in the shape of an elongated belt, is connected and fixed thereto. When the take-up shaft 20 is rotated in one direction around the axis thereof (hereinafter, this direction will be called the "take-up direction"), the webbing is taken-up from the proximal end side thereof in layers onto the outer peripheral portion of the take-up shaft 20. On the other hand, when the webbing is pulled from the distal end side thereof, while the take-up shaft 20 rotates accompanying this, the webbing is pulled-out (hereinafter, the rotational direction of the take-up shaft 20 at the time when the webbing is pulled-out will be called the "pull-out direction").

One end of the take-up shaft 20 passes through the leg plate 18 and projects out to the exterior of the frame 12. A lock mechanism, which is not shown, is disposed at the side of the leg plate 18. The lock mechanism is structured to include an acceleration sensor, and is connected to a lock plate 22, which spans between the leg plate 16 and the leg plate 18, and to a torsion bar 24 which is provided at the axially central portion of the take-up shaft 20. When the vehicle rapidly decelerates or the like, due to the operation of the lock mechanism, pull-out direction rotation of the take-up shaft 20 is impeded while one end of the torsion bar 24 is restrained via the lock plate 22 and energy absorption is carried out.

On the other hand, the other end of the take-up shaft 20 passes through the leg plate 16 and projects out slightly at the exterior of the frame 12. A connecting screw 21, which is formed in the shape of a hexagonal pillar, is connected coaxially and integrally to the other end side of the take-up shaft 20.

Further, a clutch case 101, which serves as a case structuring a clutch 100 relating to the present embodiment, is disposed at the outer side of the leg plate 16. This clutch case 101 is formed in the shape of a box of a metal material or the like (e.g., an aluminum alloy or the like), and has an opening toward the opposite side of the leg plate 16 (hereinafter, the directions at the clutch case 101 will be explained by considering this opening to be the upper side). A clutch cover 102, which is formed from an iron plate or the like as a case, is disposed at the opening side of the clutch case 101. The clutch case 101 and the clutch cover 102 are integrally fixed to the leg plate 16 by screws 104.

A through hole 106 which is round is formed coaxially to the take-up shaft 20 in the central portion of the floor wall of the clutch case 101, and the connecting screw 21 passes therethrough. Further, the region at the periphery of this through hole 106 projects out slightly in a round shape toward the side opposite the leg plate 16 (the opening side of the clutch case 101), and a ring-shaped sliding surface 108 is formed thereat. A bushing supporting portion 110, which is shaped as a cylindrical tube and projects out toward the side opposite the leg plate 16, is formed at the hole edge portion of the through hole 106. A bushing 112 (see FIGS. 1 and 2), which is formed in the shape of a ring of a resin material or the like, is supported at this bushing supporting portion 110.

A clutch gear portion 28 is disposed at the interior of the clutch case 101. The clutch gear portion 28 has a worm gear 34. The axis of the worm gear 34 is disposed in a state orthogonal to the take-up shaft 20, and end portions of the worm gear 34 are supported at the clutch case 101 via bushes 36, 37. The distal end portion of the worm gear 34 is provided to project out to the exterior from the clutch case 101. Further, at a bearing portion of the clutch case 101 which supports the distal end portion of the worm gear 34, a steel ball 38 is accommodated and contacts the distal end portion of the worm gear 34, and moreover, an adjusting screw 40 is screwed-in. Due to the adjusting screw 40 pushing the steel ball 38 at the distal end portion of the adjusting screw 40, the steel ball 38 is made to press-contact the distal end of the worm gear 34. In this way, displacement in the axial direction of the worm gear 34 is restricted (thrust is adjusted). Note that the steel ball 38 may be a structure which is formed integrally with the distal end portion of the adjusting screw 40 (a structure in which the distal end portion of the adjusting screw 40 is formed in the shape of a ball).

A clutch main body portion 114, which structures the clutch 100 relating to the present embodiment, is provided at the upper side of the worm gear 34.

Figure 1:
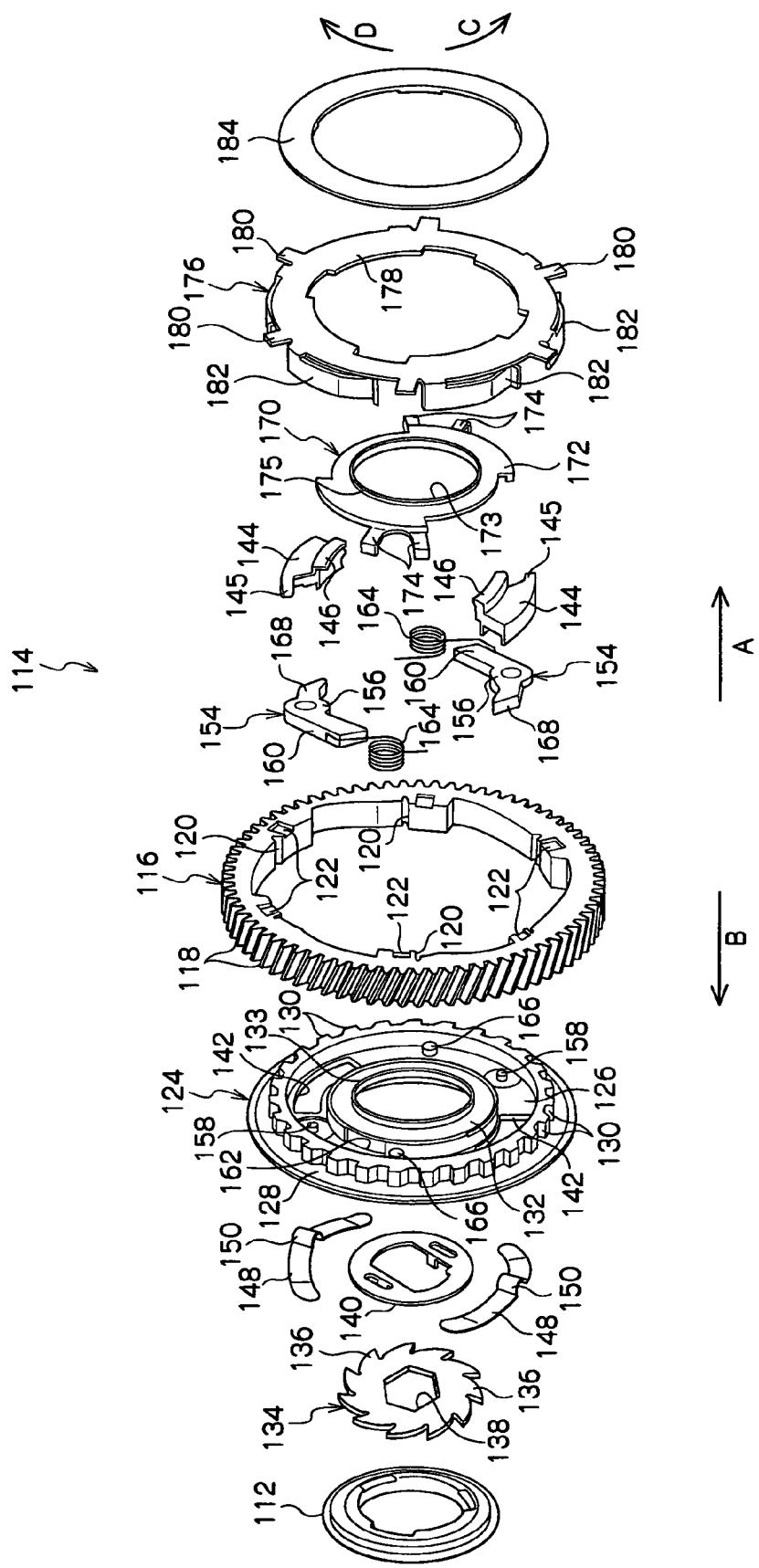
FIG. 1 is an exploded perspective view showing the structures of main portions of a clutch which is a structural member of a webbing retractor relating to an embodiment of the present invention.
Figure 2:
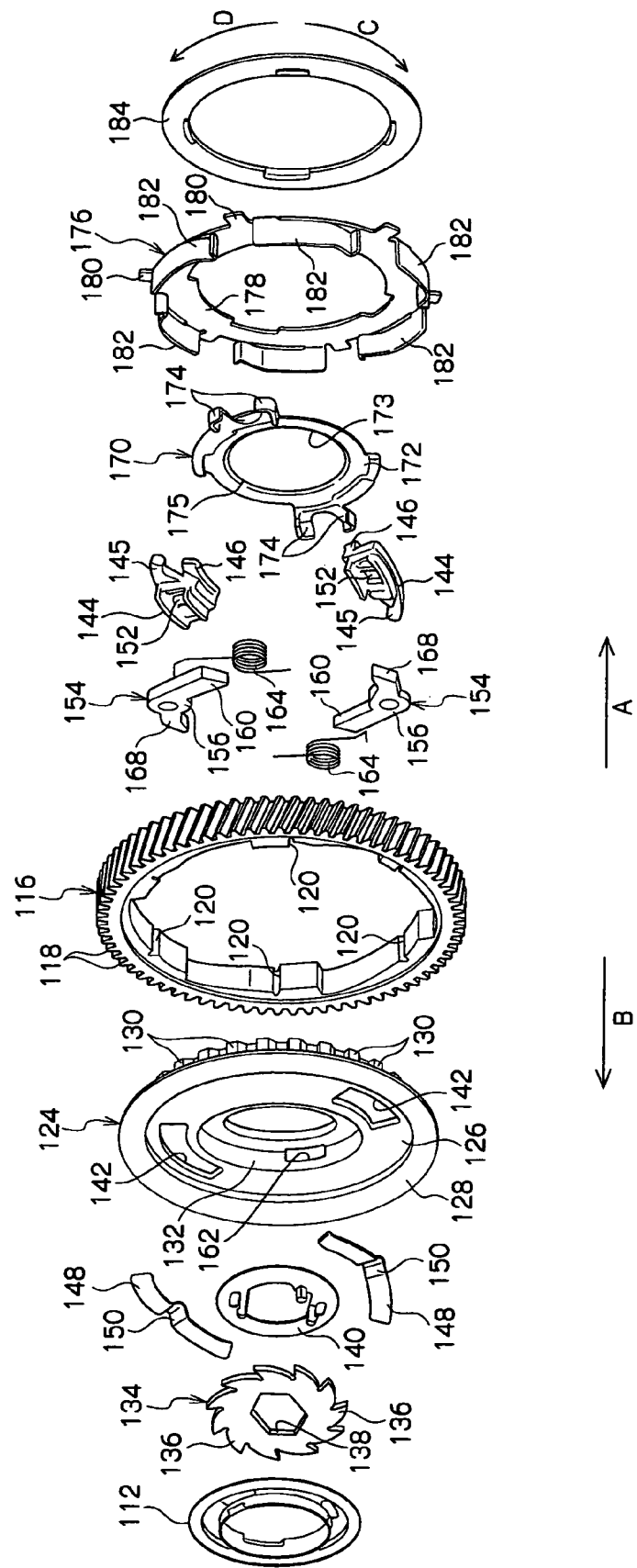
FIG. 2 is an exploded perspective view showing the structures of the main portions of the clutch relating to the present embodiment.

Here, the structure of the clutch main body portion 114 is shown in exploded perspective views in FIG. 1 and FIG. 2.

As shown in these figures, the clutch main body portion 114 has a gear wheel 116. The gear wheel 116 is formed in the shape of a ring of a resin material or the like, and is disposed coaxially to the take-up shaft 20, and worm wheel teeth 118 are formed at the outer peripheral portion thereof. The worm wheel teeth 118 mesh with the aforementioned worm gear 34. Further, a plurality of (six in the present embodiment) peripheral direction load receiving portions 120 are formed at uniform intervals at the inner peripheral portion of the gear wheel 116 along the inner peripheral direction thereof. These peripheral direction load receiving portions 120 correspond to spring claws 182 of a ring 176 which will be described later. Further, a plurality of (six in the present embodiment) detent concave portions 122 are formed in the end surface of the gear wheel 116 at one side in the axial direction (the arrow A direction side in FIG. 1 and FIG. 2) at uniform intervals along the peripheral direction thereof. These detent concave portions 122 correspond to detent claws 180 of the ring 176 which will be described later.

A rotor 124, which is formed in the shape of a disc of a metal material or the like (e.g., a zinc-aluminum alloy or the like) is disposed coaxially to the gear wheel 116 at the inner side of the gear wheel 116. The rotor 124 has a main body portion 126 which is shaped as a cylindrical tube having a floor, and a flange portion 128 which projects out in the radial direction at an axial direction one side (the arrow B direction side in FIG. 1 and FIG. 2) of the main body portion 126.

A plurality of external teeth 130 are formed at the outer peripheral portion of the main body portion 126 at uniform intervals along the peripheral direction thereof. The cross-sectional configurations of the respective external teeth 130 are trapezoidal, and the side walls at one side (the arrow C direction side in FIG. 1 and FIG. 2) thereof along the peripheral direction of the main body portion 126 are formed at an incline with respect to the peripheral direction of the main body portion 126, and the side walls at the other side (the arrow D direction side in FIG. 1 and FIG. 2) thereof along the peripheral direction of the main body portion 126 are formed parallel along the radial direction of the main body portion 126. The respective external teeth 130 correspond to the spring claws 182 of the ring 176 which will be described later.

An accommodating portion 132, which is substantially cylindrically-tube-shaped, is formed coaxially at the central portion of the floor wall of the main body portion 126. A ring-shaped spindle (pivot) portion 133 projects out coaxially at an axial direction one side (the arrow A direction side in FIG. 1 and FIG. 2) of the accommodating portion 132. The spindle portion 133 is rotatably supported at a round hole 135 formed in the clutch cover 102, via a rotation supporting portion 175 of a holder 170 which will be described later. Further, the aforementioned bushing 112 is rotatably fit-together with the axial direction other side (the arrow B direction side in FIG. 1 and FIG. 2) of the accommodating portion 132, and the axial direction other side of the accommodating portion 132 is rotatably supported at the clutch case 101 via the bushing 112. In this way, the main body portion 126 (the rotor 124) can rotate around its own axis.

A ratchet 134, which is formed substantially in the shape of a ring by an iron plate or the like, is accommodated within the accommodating portion 132 of the main body portion 126. External teeth 136 which are so-called ratchet teeth are formed at the outer peripheral portion of the ratchet 134. Further, a through hole 138, which has a hexagonal cross-sectional configuration, is formed in the axially central portion of the ratchet 134, and in the state in which the aforementioned connecting screw 21 passes therethrough, the ratchet 134 and the connecting screw 21 are connected integrally around the axis thereof. In this way, the ratchet 134 and the take-up shaft 20 rotate integrally via the connecting screw 21.

Note that one axial direction side (the arrow B direction side in FIG. 1 and FIG. 2) of the ratchet 134 slidably abuts the aforementioned bushing 112. Further, a washer 140, which is formed of a resin material or the like, is mounted to the axial direction other side (the arrow A direction side in FIG. 1 and FIG. 2) of the ratchet 134. The washer 140 slidably abuts the ring-shaped floor wall of the accommodating portion 132, and displacement along the axial direction of the ratchet 138 is thereby restricted.

On the other hand, a pair of guide holes 142, which are curved along the peripheral direction of the main body portion 126, are formed in the floor wall of the main body portion 126 at the radial direction outer side of the accommodating portion 132. A slider 144, which is formed of a resin material or the like substantially in the shape of a block which curves along the peripheral direction of the main body portion 126, is slidably mounted to each guide hole 142. This pair of sliders 144 are held by the inner peripheral surface of the main body portion 126 and the outer peripheral surface of the accommodating portion 132, and can move relative to the main body portion 126 (the rotor 124) within a predetermined range along the guide holes 142.

Figure 3:
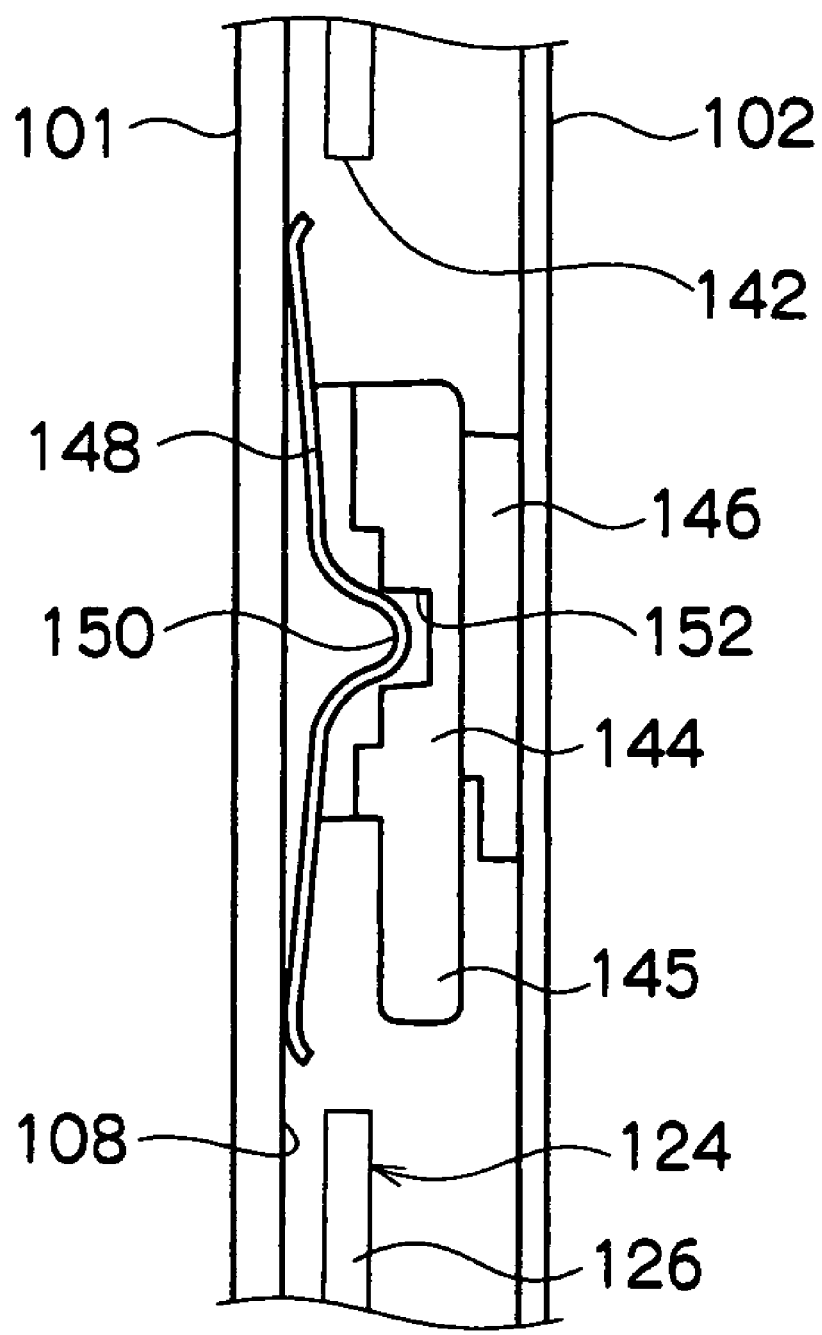
FIG. 3 is a sectional view showing a partial structure of the clutch relating to the present embodiment.

A sliding piece 146 projects out at one side (the arrow A direction side in FIG. 1 and FIG. 2) of each slider 144, and, as shown in FIG. 3, the sliding piece 146 abuts the clutch cover 102. Further, a retainer 148 is provided at the side of each slider 144 opposite the sliding piece 146. The retainer 148 is a narrow metal piece having a spring property, and is bent in a gentle V-shape (is bent gently at the central portion thereof). A connecting portion 150, which is provided at the longitudinal direction central portion of the retainer 148, is fit-into a connecting hole 152 formed in the slider 144 such that the retainer 148 is connected integrally with the slider 144, and the longitudinal direction both end portions of the retainer 148 are respectively pushed against the sliding surface 108 of the above-described clutch case 101 and elastically deform by a predetermined amount.

Therefore, the sliding piece 146 of the slider 144 is pushed against the clutch cover 102 due to the elastic force of the retainer 148, and a predetermined frictional force acts on the movement of the slider 144 along the guide hole 142 (the relative movement with respect to the rotor 124). Therefore, when the rotor 124 rotates, due to the frictional force applied to the sliding pieces 146 and the longitudinal direction both end portions of the retainers 148, the sliders 144 are temporarily held at the case (the clutch case 101 and the clutch cover 102), and move relatively to the rotor 124 within predetermined ranges along the guide holes 142.

Further, a pressing/holding piece 145 is formed at one end portion in the curving direction (the end portion at the arrow C direction side in FIG. 1 and FIG. 2) of each slider 144. These pressing/holding pieces 145 respectively correspond to a pair of lock bars 154.

Each lock bar 154 is formed in a gradual V-shape from an iron plate or the like, and is disposed at one end side in the curving direction of each slider 144, and has a ring-shaped shaft receiving portion 156. Each shaft receiving portion 156 is rotatably supported by a solid-cylindrical supporting shaft 158 which projects-out at the floor wall of the main body portion 126. A connecting piece 160 projects-out at the side of each shaft receiving portion 156 opposite the slider 144 (the arrow C direction side in FIG. 1 and FIG. 2). Due to these connecting pieces 160 rotating together with the shaft receiving portions 156 around the supporting shafts 158, the distal end portions thereof pass through hole portions 162 formed in the accommodating portion 132 of the rotor 124, and mesh with the external teeth 136 of the above-described ratchet 134. These connecting pieces 160 are always urged in the direction of meshing with the external teeth 136 (the ratchet 134) by the urging forces of torsion coil springs 164. The torsion coil springs 164 are supported by solid-cylindrical supporting shafts 166 which project-out at the floor wall of the main body portion 126 of the rotor 124.

A releasing piece 168 corresponding to the aforementioned pushing/holding piece 145 projects out at the slider 144 side (the arrow D direction side in FIG. 1 and FIG. 2) of each shaft receiving portion 156. The end surface portion, which faces the slider 144, of each releasing piece 168 is formed so as to be inclined with respect to the moving direction (the arrow C direction and the arrow D direction in FIG. 1 and FIG. 2) of the slider 144.

Figure 4A:
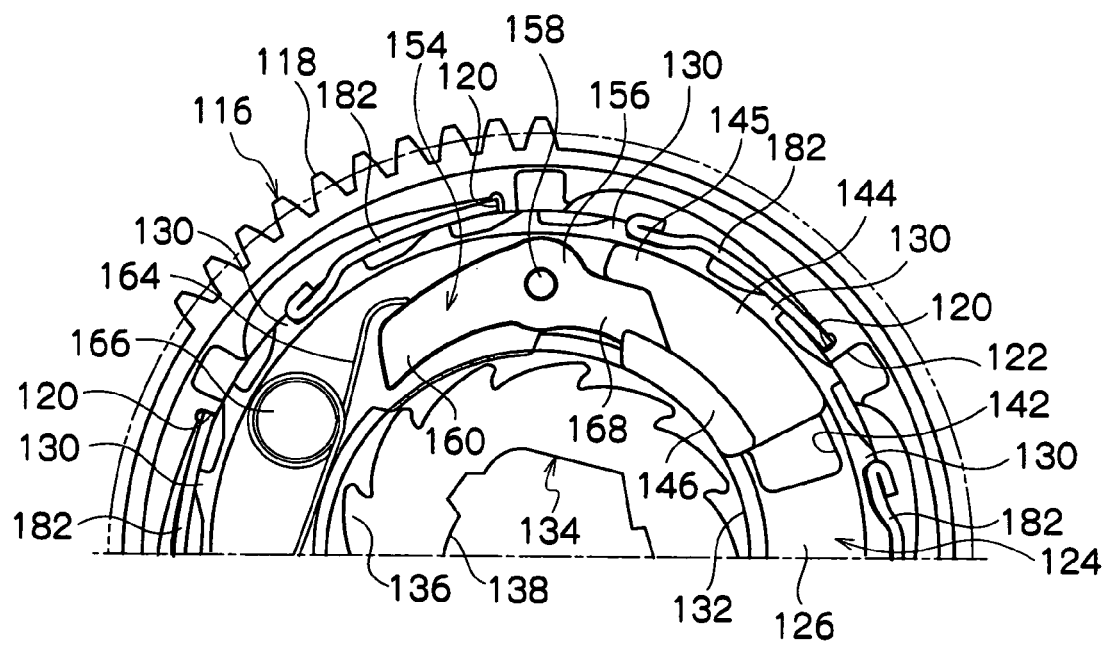
FIG. 4A is a side view showing the structure of the clutch relating to the present embodiment, and showing a state in which a lock bar is held at a slider.
Figure 4B:
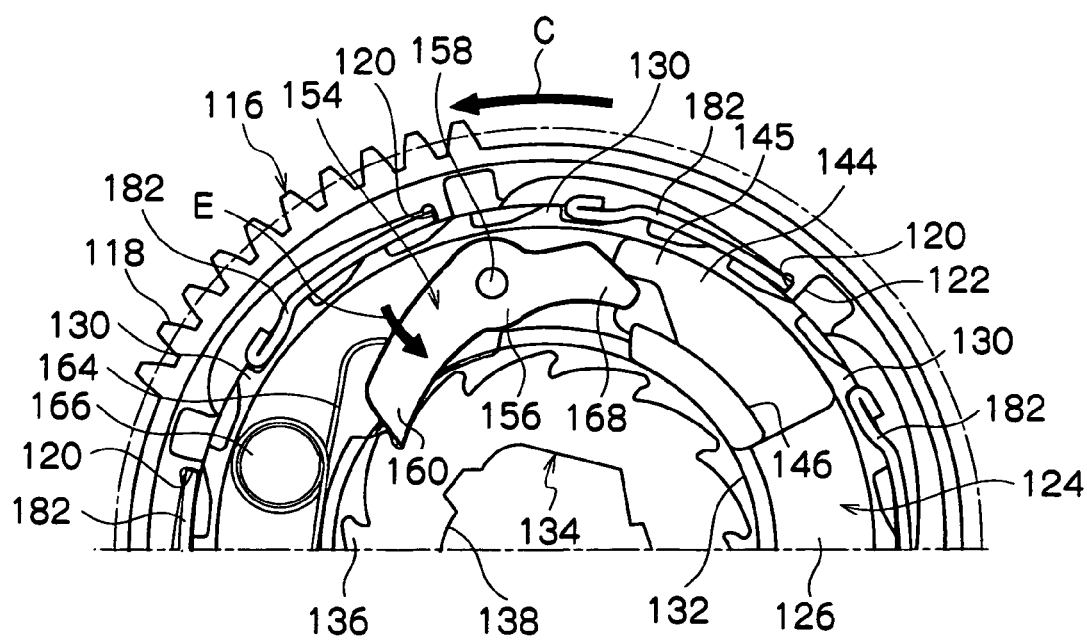
FIG. 4B is a side view showing the structure of the clutch relating to the present embodiment, and showing a state in which the lock bar is engaged with a ratchet.

Here, as shown in FIGS. 4(A) and 4(B), due to the rotor 124 moving relative to the sliders 144, the lock bars 154 move so as to approach or move away from the sliders 144 within a predetermined range. In the state in which the lock bar 154 is near the slider 144 (the state shown in FIG. 4(A)), the releasing piece 168 of the lock bar 154 is in the inner side (the ratchet 134 side) of the pushing/holding piece 145 of the slider 144. In this way, the lock bar 154 is held at a position of released engagement against the urging force of the torsion coil spring 164. In this state, the connecting piece 160 of the lock bar 154 is apart from the ratchet 134.

On the other hand, in the state in which the lock bar 154 is apart from the slider 144 (the state shown in FIG. 4(B)), the holding of the releasing piece 168 of the lock bar 154 by the pushing/holding piece 145 of the slider 144 is released. In this state, the connecting piece 160 of the lock bar 154 is moved toward the ratchet 134 (engaging position) by the urging force of the torsion coil spring 164, and the distal end portion thereof meshes with the external teeth 136.

Note that, in the clutch main body 114 relating to the present embodiment, the slider 144 is usually disposed near to the lock bar 154. Accordingly, due to the releasing piece 168 usually being held by the pushing/holding piece 145 of the slider 144, the lock bar 154 is held at the position of released engagement (the state shown in FIG. 4(A)).

A holder 170, which is formed in the shape of a ring of a resin material or the like, is disposed at the side opposite the rotor 124 (the arrow A direction side in FIG. 1 and FIG. 2) as seen from the sliders 144. The holder 170 has a ring-shaped main body portion 172, and a pair of holding claws 174 which are provided at the outer peripheral portion of the main body portion 172. The main body portion 172 restricts axial direction displacement of the lock bars 154 with respect to the supporting shafts 158 (the rotor 124), and the pair of holding claws 174 restrict axial direction displacement of the torsion coil springs 164 with respect to the supporting shafts 166 (the rotor 124).

The spindle portion 133 of the rotor 124 passes through a round hole 173 formed in the central portion of the main body portion 172. The rotation supporting portion 175, which projects out slightly in the shape of a cylindrical tube toward the side opposite the rotor 124 (the clutch cover 102 side), is provided at the hole edge portion of the round hole 173, and the spindle portion 133 of the rotor 124 is rotatably supported at the round hole 135 of the clutch cover 102 via the rotation supporting portion 175.

The ring 176, which is formed of a metal material (e.g., SUS or the like) having a spring property, is disposed at the radial direction outer side of the holder 170 at one axial direction side (the arrow A direction side in FIG. 1 and FIG.

2) of the rotor 124. The ring 176 has a cover portion 178 which is formed in the shape of a ring. The plurality of (six in the present embodiment) detent claws 180, which project out toward the radial direction outer side, are formed integrally with the outer peripheral portion of the cover portion 178. These detent claws 180 fit-together with the detent concave portions 122 of the above-described gear wheel 116. In this way, the ring 176 is connected integrally with the gear wheel 116 in the peripheral direction thereof.

The plurality of (six in the present embodiment) spring claws 182, which are shaped as narrow plates having elasticity (a spring property), are formed integrally with the outer peripheral portion of the cover portion 178 at uniform intervals along the peripheral direction of the cover portion 178. The proximal end portion of each spring claw 182 is connected integrally to the cover portion 178. The longitudinal direction intermediate portion of each spring claw 182 is bent slightly toward the radial direction inner side of the cover portion 178, and the distal end portion of each spring claw 182 is bent toward the radial direction outer side of the cover portion 178, so as to be curved overall along the peripheral direction of the cover portion 178.

Figure 5A:
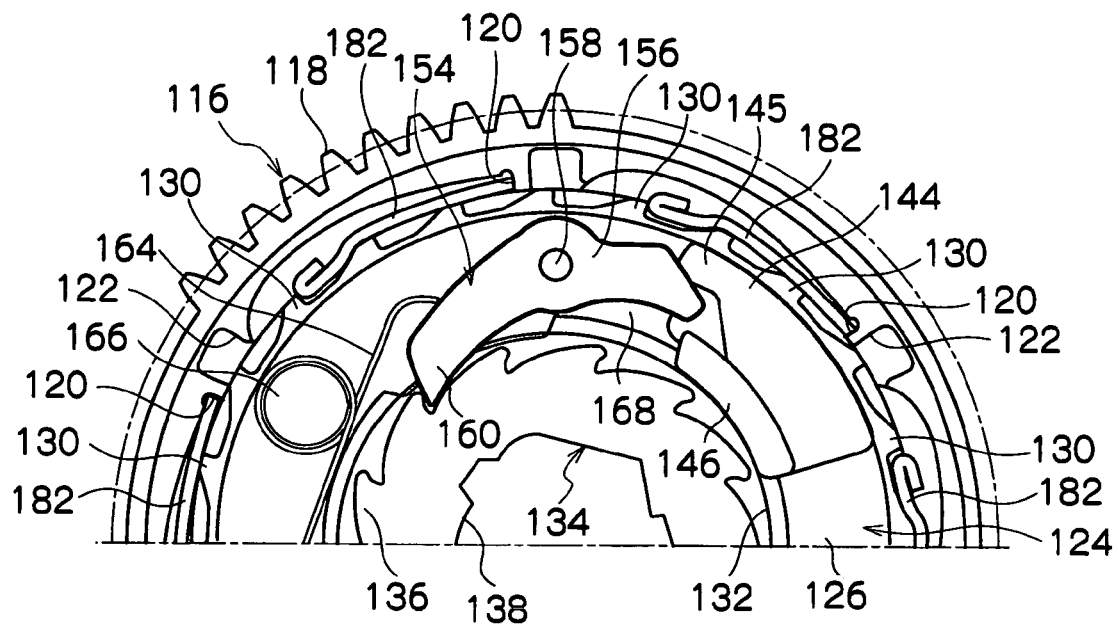
FIG. 5A is a side view showing the structure of the clutch relating to the present embodiment, and showing a state in which a gear wheel and a rotor are connected by spring claws.

As shown in FIG. 5(A), these spring claws 182 are disposed along the peripheral direction of the rotor 124 and the gear wheel 116 between the external teeth 130 of the rotor 124 and the inner peripheral surface of the gear wheel 116, and push the inner peripheral portions thereof against the external teeth 130 of the rotor 124 due to their own elastic forces. In this way, the ring 176 is held integrally with the rotor 124.

The outer side portion of each spring claw 182 is respectively engaged with the inner peripheral surface of the gear wheel 116, and the gear wheel 116 is supported at the rotor 124 via the respective spring claws 182. In this state, axial direction movement of the gear wheel 116 is restricted by the detent claws 180 of the ring 176 and the flange portion 128 of the rotor 124. Moreover, in this state, falling-out of the sliders 144, the lock bars 154, the torsion coil springs 164, and the holder 170 from the rotor 124 is prevented by the cover portion 178 of the ring 176, and these structural members are held at predetermined assembly positions.

The distal end portions of the respective spring claws 182 enter-in the valley portions of the external teeth 130 and abut one side walls of the external teeth 130 (the side walls at the sides which are formed parallel along the radial direction of the main body portion 126). The proximal end portions of the spring claws 182 abut the peripheral direction load receiving portions 120 of the above-described gear wheel 116. In this way, the gear wheel 116 and the rotor 124 are integrally connected by the respective spring claws 182 with respect to the peripheral direction thereof (relative rotation is restricted), and, when the gear wheel 116 rotates, the gear wheel 116 and the rotor 124 basically rotate integrally.

Figure 5B:
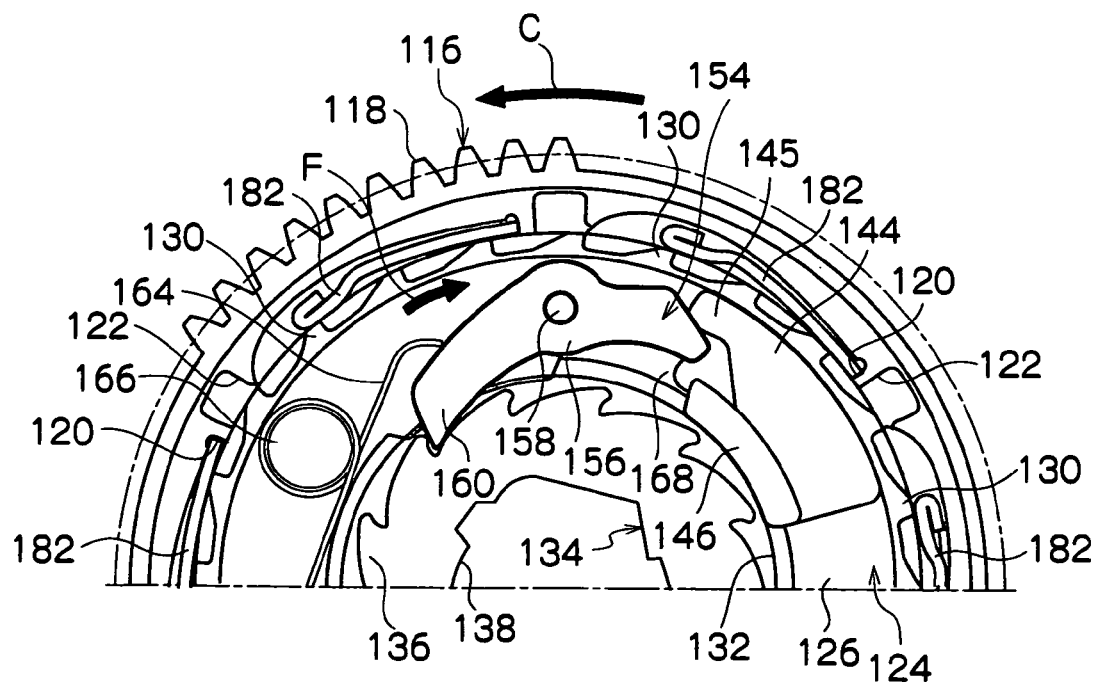
FIG. 5B is a side view showing the structure of the clutch relating to the present embodiment, and showing a state in which the gear wheel and the rotor idly run relatively.

In this case, the rotational force of the gear wheel 116 in the take-up direction (the arrow C direction in FIG. 5(B)) is transferred to the proximal end portions of the spring claws 182 via the peripheral direction load receiving portions 120, and is transferred from the distal end portions of the spring claws 182 to the external teeth 130 of the rotor 124. The gear wheel 116 receives, via the peripheral direction load receiving portions 120 and along the peripheral direction, the load applied from the spring claws 182. Namely, the direction in which the gear wheel 116 receives load from the spring claws 182 is the direction along the rotating direction thereof.

As described above, the spring claw 182 is a metal piece having a spring property. Therefore, if the rotational force of the gear wheel 116 with respect to the rotor 124 is large enough to pull-out the distal end portions of the respective spring claws 182 from the valley portions of the external teeth 130 against the spring forces (urging forces) of the spring claws 182, the connection around the axis between the gear wheel 116 and the rotor 124 by the spring claws 182 is released. In this way, relative rotation between the gear wheel 116 and the rotor 124 becomes possible (see FIG. 5(B)).

Further, the rotational force of the gear wheel 116 in the pull-out direction (the opposite direction of arrow C in FIG. 5(B)) is transferred to the detent claws 180 of the ring 176 via the detent concave portions 122, and is transferred from the distal end portions of the spring claws 182 of the ring 176 to the external teeth 130 of the rotor 124.

On the other hand, a spacer 184, which is formed in the shape of a ring from a resin material or the like, is disposed at the side of the ring 176 opposite the rotor 124 (the arrow A direction side in FIG. 1 and FIG. 2). The spacer 184 is nipped between the ring 176 and the clutch cover 102, and cannot rotate around its axis relative to the ring 176. The spacer 184 prevents the ring 176 which is formed of metal from directly sliding against the clutch cover 102, and makes the relative rotation of the ring 176 (the clutch main body portion 114) with respect to the clutch cover 102 smooth.

At the clutch 100 having such a structure, due to the worm gear 34 of the clutch gear portion 28 rotating, the gear wheel 116 of the clutch main body portion 114 rotates. The clutch main body portion 114 and the clutch gear portion 28 are assembled integrally in the single case (the clutch case 101 and the clutch cover 102), and are structured as a unit on the whole.

Figure 9:
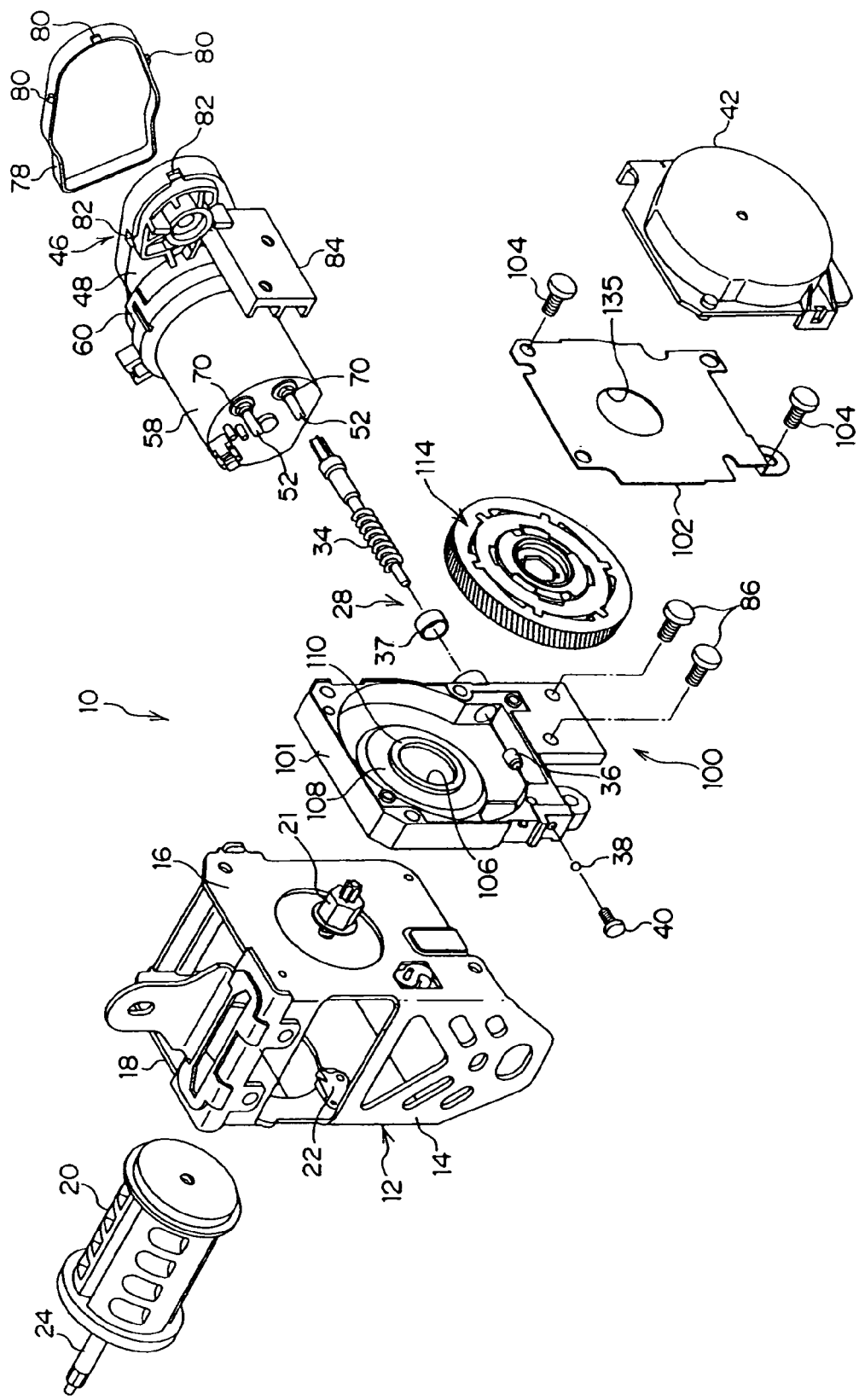
FIG. 9 is an exploded perspective view showing the overall structure of the webbing retractor relating to the present embodiment.

On the other hand, as shown in FIG. 9, a spring complete 42 is disposed at a side of the clutch cover 102. The spring complete 42 houses, at the interior thereof, a spiral spring (not shown). The end portion at the outer side in the spiral direction of this spiral spring is anchored on the case main body, and the end portion at the inner side in the spiral direction is anchored on the distal end of the connecting screw 21 which is passed through the clutch main body portion 114, such that the spiral spring urges the take-up shaft 20 in the take-up direction.

On yet the other hand, a motor 44 and a motor gear portion 46 are disposed between the leg plate 16 and the leg plate 18 beneath the take-up shaft 20 (see FIG. 10).

Figure 8:
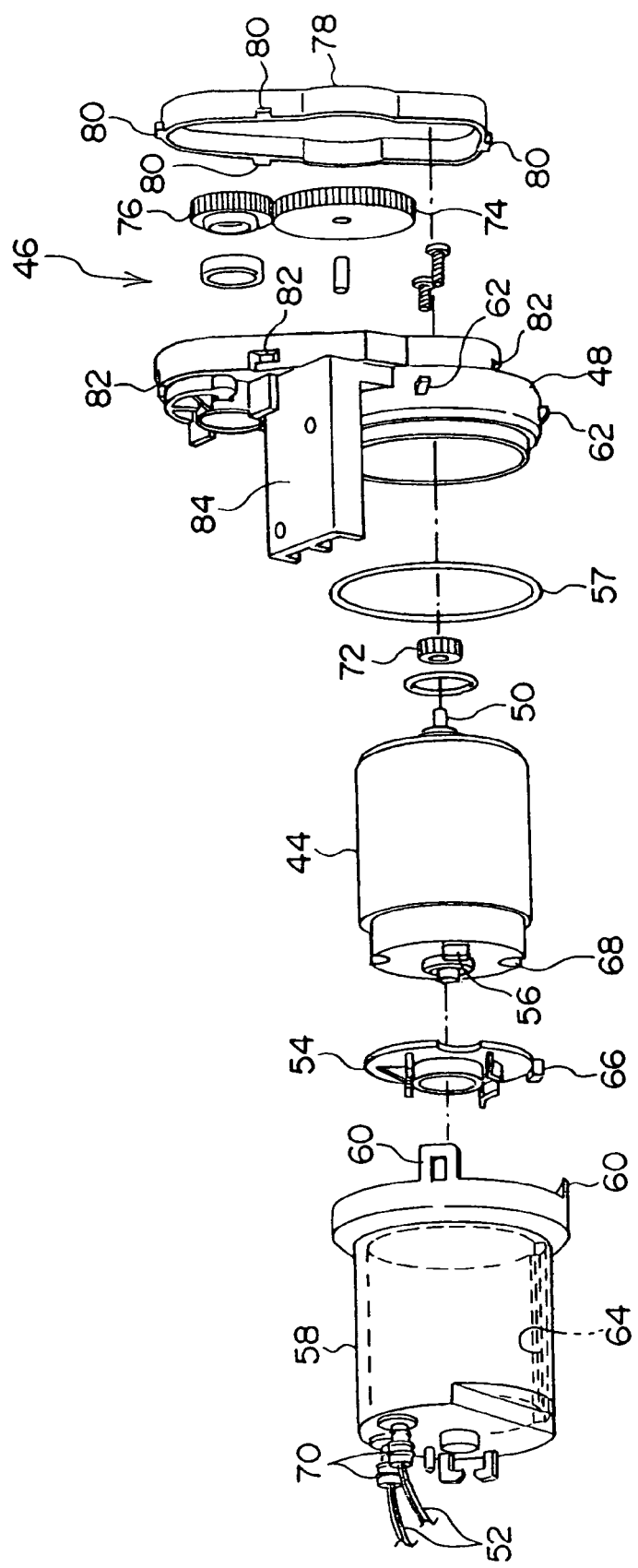
FIG. 8 is an exploded perspective view showing the structures of peripheral members including a motor which is a structural member of the webbing retractor relating to the present embodiment.

Here, the structures of the motor 44 and the motor gear portion 46 are shown in an exploded perspective view in FIG. 8.

The motor 44 and the motor gear portion 46 have a housing 48. The motor 44 is mounted to one side of the housing 48, and the motor gear portion 46 is provided at the other side of the housing 48. The distal end side (output side) of a rotating shaft 50 of the motor 44 is, in a state of facing the housing 48, fixed to one side of the housing 48, and the distal end (output side) of the rotating shaft 50 projects out at the other side of the housing 48 (the motor gear portion 46 side). Further, a base plate 54, to which are connected electrical harnesses 52 for motor driving, is mounted to the rear end side of the motor 44. The electrical harnesses 52 are connected to the base plate 54, and the connected portions of the electrical harnesses 52 are connected by crimp terminal structures to a feed terminal 56 provided at the main body portion of the motor 44. Note that there may be a structure in which the connected portions of the electrical harnesses 52 and the feed terminal 56 are connected by soldering or the like.

The motor 44 is covered by a motor cover 58. Claw portions 60 are provided at the motor cover 58. Due to these claw portions 60 fitting-together and engaging with claw receiving projections 62 provided at the housing 48, the motor cover 58 is fixed to the housing 48.

Further, a first concave portion 64 is provided in the motor cover 58, and a convex portion 66, which can fit in the first concave portion 64, is provided at the base plate 54 in correspondence with the first concave portion 64. Further, a second concave portion 68, in which the convex portion 66 can fit, is provided in the motor 44 in correspondence with the convex portion 66 of the base plate 54.

Due to the convex portion 66 being fit into the second concave portion 68, the motor 44 is positioned with respect to the base plate 54, and due to the convex portion 66 being fit into the first concave portion 64, the base plate 54 is positioned at the motor cover 58. Further, due to the claw portions 60 being fit-together and engaged with the claw receiving projections 62 and the motor cover 58 being mounted and fixed to the housing 48, the assembled position of the motor 44 around the axis with respect to the housing 48 is specified unambiguously.

Further, the electrical harnesses 52 for motor driving are pulled-out from the rear end portion of the motor cover 58 toward the back plate 14 of the frame 12 which is opposite the output side of the motor 44. Moreover, these pulled-out portions of the electrical harnesses 52 of the motor cover 58 are made waterproof by rubber caps 70.

On the other hand, a pinion 72 which structures a plurality of spur gears of the motor gear portion 46, is mounted to the distal end of the rotating shaft 50 of the motor 44 which projects out to the other side (the motor gear portion 46 side) of the housing 48. Further, a gear 74 and a gear 76, which are respectively external-toothed spur gears and which structure a driving force transferring means, are accommodated in a state of being meshed with one another at the motor gear portion 46. The gear 74, gear 76 are both disposed in states in which the axes thereof are parallel to the rotating shaft 50 of the motor 44. The gear 74 meshes with the pinion 72, and the gear 76 which is the final spur gear is removably connected to one end portion of the worm gear 34 which projects out to the exterior from the clutch case 101 of the above-described clutch gear portion 28. Due to this structure, when the motor 44 is driven, the driving force is transferred via the pinion 72, the gear 74, and the gear 76, and the worm gear 34 is rotated.

Further, the pinion 72, the gear 74 and the gear 76 are covered by a gear cover 78 which is mounted to the housing 48. Claw portions 80 are provided at the gear cover 78, and the gear cover 78 is fixed to the housing 48 due to these claw portions 80 fitting-together and engaging with claw receiving portions 82 provided at the housing 48.

In this way, the motor 44 and the motor gear portion 46 are both integrally assembled to the single housing 48, and are structured as a unit overall.

The motor 44 and the motor gear portion 46 having the above-described structure are removably mounted, by screws 86 and via a mounting stay 84 which is provided integrally with the housing 48, to the clutch case 101 (i.e., the frame 12) which houses the clutch main body portion 114 and the clutch gear portion 28. In the state in which the housing 48 is mounted to the clutch case 101 (the frame 12), the rotating shaft 50 of the motor 44 is orthogonal to the take-up shaft 20, and the output side thereof is in a state of facing toward the side opposite the back plate 14 of the frame 12, and is between the pair of the leg plate 16 and the leg plate 18, and is positioned directly beneath the take-up shaft 20.

Further, at the motor 44 and the motor gear portion 46 having the above-described structure, the gear 76 serving as the final spur gear of the motor gear portion 46 is connected to the clutch 26 and the worm gear 34 of the clutch gear portion 28 so as to be able to be separated therefrom. Moreover, because the mounting stay 84 is removably mounted to the clutch case 101 by the screws 86, by removing the screws 86 and removing the mounting stay 84 from the clutch case 101, the motor 44 and the motor gear portion 46 can, while remaining in assembled states, independently be separated from the clutch case 101 (the frame 12).

Still further, the above-described motor 44 is structured so as to be operated, for example, on the basis of a detection signal of a forward monitoring device or the like.

Operation of the present embodiment will be described next.

In the webbing retractor 10 of the above-described structure, the sliders 144 of the clutch main body portion 114 are usually positioned near the lock bars 154 as shown in FIG. 4(A). Accordingly, the releasing pieces 168 of the lock bars 154 are usually held by the pushing/holding pieces 145 of the sliders 144, and the connecting pieces 160 of the lock bars 154 are apart from the external teeth 136 of the ratchet 134. Therefore, the ratchet 134 (the take-up shaft 20) can rotate relative to the rotor 124.

When a vehicle occupant sits in a seat of the vehicle and pulls the webbing which is accommodated in the present webbing retractor 10, the webbing is pulled-out while the take-up shaft 20 rotates in the pull-out direction. Due to the vehicle occupant placing the webbing around his/her body and, for example, engaging a tongue plate provided at the webbing with a buckle device, the webbing can be applied to the body.

Here, for example, if an obstacle exists in front of the vehicle while the vehicle is traveling and the interval between the vehicle and the obstacle (the distance from the vehicle to the obstacle) comes within a predetermined range, the driving of the motor 44 is started, and the rotating shaft 50 is rotated rapidly (suddenly).

When the rotating shaft 50 of the motor 44 is rotated, the rotational force thereof is transferred to the gear wheel 116 of the clutch main body portion 114, via the pinion 72, the gear 74 and the gear 76 of the motor gear portion 46, and the worm gear 34 of the clutch gear portion 28, and the gear wheel 116 is rotated rapidly in the take-up direction. The rotation of the gear wheel 116 in the take-up direction is transferred to the proximal end portions of the spring claws 182 of the ring 176 via the peripheral direction load receiving portions 120, and is transferred from the distal end portions of the spring claws 182 to the external teeth 130 of the rotor 124, and the rotor 124 is rotated rapidly in the take-up direction.

At this time, the sliders 144 are held at the case (the clutch case 101 and the clutch cover 102) by the frictional force which is applied to the sliding pieces 146 and the retainers 148. Therefore, the rotor 124 moves relative to the sliders 144 within a predetermined range, and the lock bars 154 supported at the rotor 124 move apart from the sliders 144.

The holding of the releasing pieces 168 by the pushing/holding pieces 145 is released, and the connecting pieces 160 of the lock bars 154 move toward the ratchet 134 due to the urging forces of the torsion coil springs 164, and the distal end portions of the connecting pieces 160 mesh with the external teeth 136 of the ratchet 134 (refer to arrow E in FIG. 4(B)). In this way, the rotation of the rotor 124 in the take-up direction is transferred to the ratchet 134 via the lock bars 154, and the ratchet 134 is rotated rapidly in the take-up direction. Because the ratchet 134 is connected integrally to the take-up shaft 20, the take-up shaft 20 is rotated rapidly in the take-up direction together with the ratchet 134.

In this way, the webbing is taken-up onto the take-up shaft 20, and the slight looseness, "slack", of the webbing is eliminated, and the force of restraining the body of the vehicle occupant by the webbing improves, and even if, thereafter, the vehicle occupant carries out the operation of braking the vehicle suddenly (sudden braking) and the vehicle is set in a state of rapid deceleration, the webbing reliably holds the body of the vehicle occupant.

In the state in which the "slack" is eliminated as described above, the body of the vehicle occupant becomes an obstruction, and the webbing can basically not be taken-up any further onto the take-up shaft 20. Therefore, load of greater than or equal to a predetermined value is applied to the take-up shaft 20 from the webbing, and as a result, load of greater than or equal to a predetermined value is applied to the rotor 124 via the ratchet 134 and the lock bars 154. When load of greater than or equal to a predetermined value is applied to the rotor 124, as shown in FIG. 5(A) and FIG. 5(B), due to the spring claws 182 elastically deforming, the respective distal end portions of the spring claws 182 are pulled-out from the valley portions of the external teeth 130 of the rotor 124, and relative idle running of the gear wheel 116 and the rotor 124 becomes possible (i.e., a "load limiter mechanism", see arrow F in FIG. 5(B)).

In this way, the take-up shaft 20, which is connected to the rotor 124 via the ratchet 134 and the lock bars 154, can be prevented from being rotated in the take-up direction by a force which is greater than needed due to the driving force of the motor 44, and the webbing can be preventing from binding the body of the vehicle occupant by a force which is greater than needed.

Figure 6A:
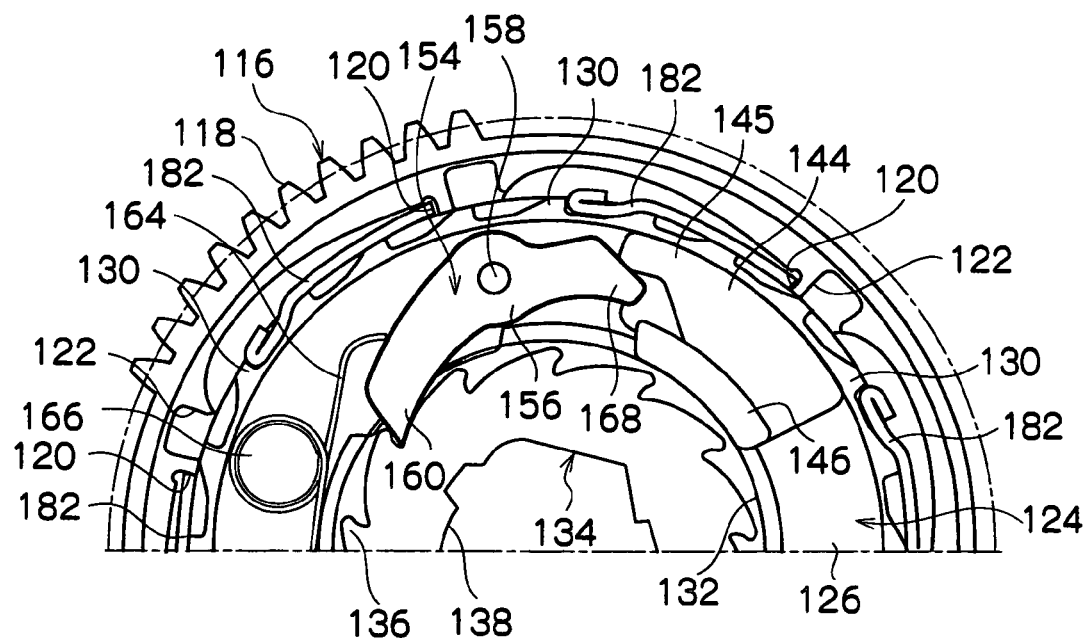
FIG. 6A is a side view showing the structure of the clutch relating to the present embodiment, and showing a state in which the lock bar is engaged with the ratchet.
Figure 6B:
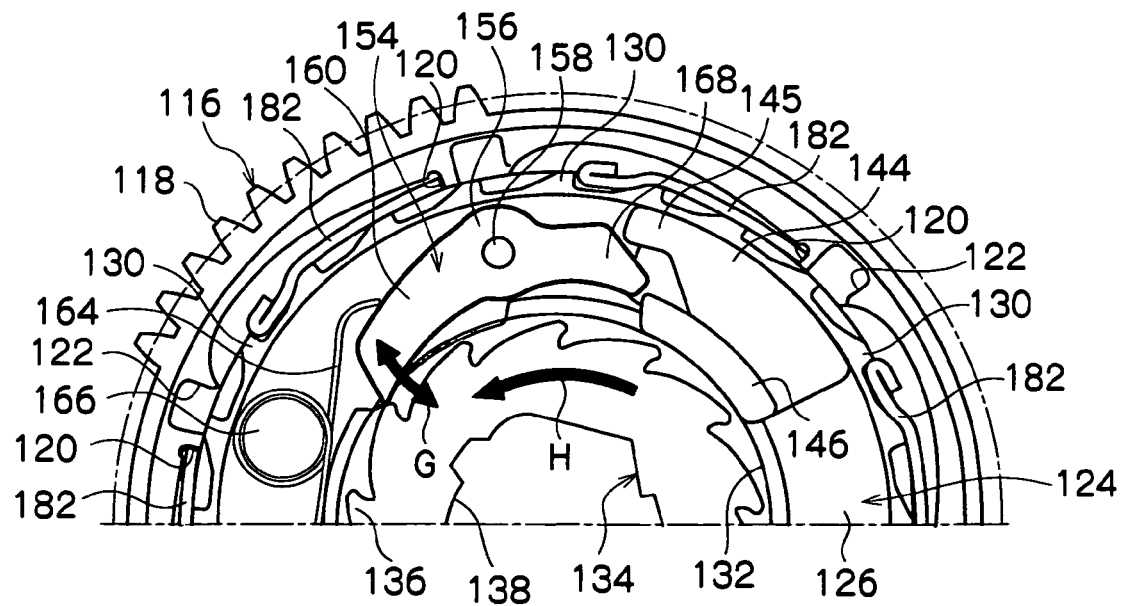
FIG. 6B is a side view showing the structure of the clutch relating to the present embodiment, and showing a state in which relative rotation, in a webbing take-up direction, of the ratchet with respect to the rotor is permitted by the lock bar.

The external teeth 136 of the ratchet 134 are ratchet teeth. Therefore, in this state, as shown in FIG. 6(A) and FIG. 6(B), when the ratchet 134 (the take-up shaft 20) starts to rotate relative to the rotor 124 in the take-up direction (see arrow H in FIG. 6(B)), due to the lock bars 154 being made to jerk-up by the external teeth 136 of the ratchet 134 (see arrow G in FIG. 6(B)), relative rotation of the ratchet 134 (the take-up shaft 20) with respect to the rotor 124 in the take-up direction is permitted. In this way, in the aforementioned state in which the "slack" is eliminated, if there becomes a state, for example, in which a vehicle collision is unavoidable, it is also possible for the take-up shaft 20 to be forcibly rotated in the take-up direction by a separate pretensioner device or the like. In this case, the force of restraining the body of the vehicle occupant by the webbing can be increased even more, and the harm to the vehicle occupant at the time of a vehicle collision can be kept to a minimum.

On the other hand, in the case in which the risk of a vehicle collision as described above is averted, the rotating shaft 50 of the motor 44 is rotated reversely. The rotational force of the take-up shaft 50 is transferred to the gear wheel 116 of the clutch main body portion 114 via the pinion 72, the gear 74 and the gear 76 of the motor gear portion 46, and the worm gear 34 of the clutch gear portion 28, and the gear wheel 116 is rotated rapidly in the pull-out direction (see arrow D in FIG. 7(A)).

The rotation of the gear wheel 116 in the pull-out direction is transferred to the detent claws 180 of the ring 176 via the detent concave portions 122 of the gear wheel 116, and is transferred from the distal end portions of the spring claws 182 of the ring 176 to the external teeth 130 of the rotor 124, and the rotor 124 is rotated rapidly in the pull-out direction.

At this time, because the sliders 144 are held at the case (the clutch case 101 and the clutch cover 102) due to the frictional force applied to the sliding pieces 146 and the retainers 148, the rotor 124 moves relative to the sliders 144 within a predetermined range, and the lock bars 154 supported at the rotor 124 move near the sliders 144.

Figures 7A, 7B:
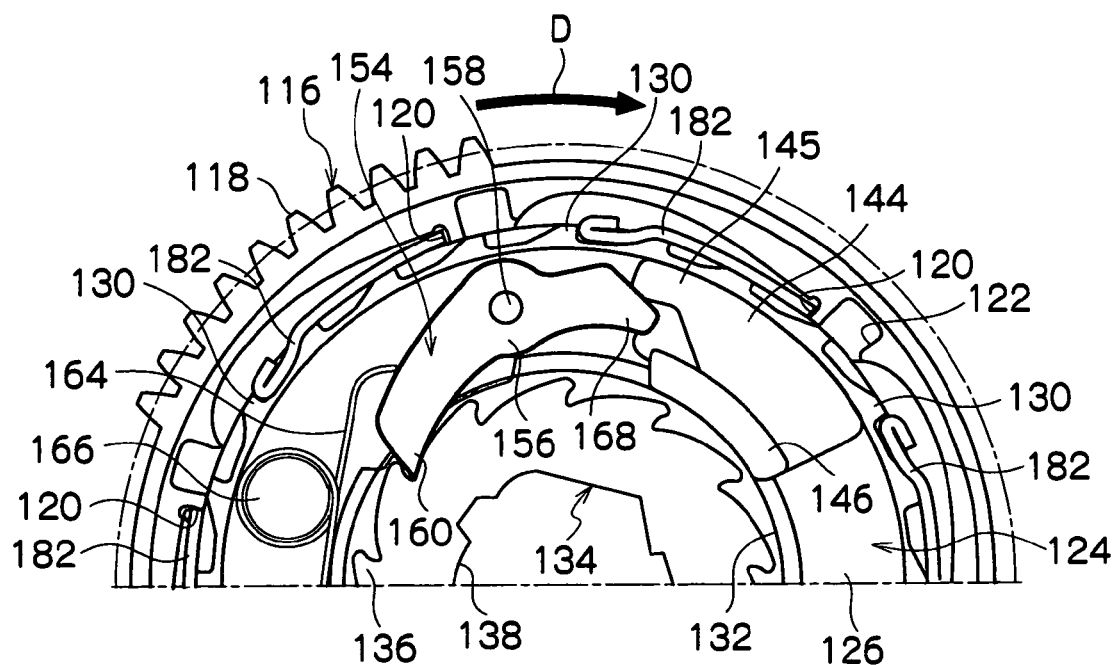
FIG. 7A is a side view showing the structure of the clutch relating to the present embodiment, and showing a state in which the lock bar is engaged with the ratchet.
FIG. 7B is a side view showing the structure of the clutch relating to the present embodiment, and showing a state in which the lock bar is held at the slider.

Due to the pushing/holding pieces 145 of the sliders 144 pushing the inclined end surfaces of the releasing pieces 168 of the lock bars 154, the releasing pieces 168 are moved (see arrow J in FIG. 7(B)) toward the ratchet 134 side against the urging forces of the torsion coil springs 164, and the connecting pieces 160 of the lock bars 154 move apart from the external teeth 136 of the ratchet 134. When the lock bars 154 further approach the sliders 144, the releasing pieces 168 of the lock bars 154 enter-in at the inner sides (the ratchet 134 sides) of the pushing/holding pieces 145 of the sliders 144, and the lock bars 154 are held at the position of released engagements (the state shown in FIG. 7(B)). In this way, the rotor 124 and the ratchet 134 are made able to rotate relatively again, and free rotation of the take-up shaft 20 becomes possible.

The peripheral direction load receiving portions 120 are provided at the gear wheel 116 of the clutch main body portion 114 of the clutch 100 of the webbing retractor 10. At the time of transfer of rotational force in the take-up direction from the gear wheel 116 to the rotor 124, the load applied from the spring claws 182 to the gear wheel 116 is applied along the peripheral direction of the gear wheel 116 via these peripheral direction load receiving portions 120. Therefore, there is no need to predict a load applied from the spring claws 182 along the radial direction of the gear wheel 116, at the aforementioned time of transfer of rotational force, and increase the rigidity of the gear wheel 116.

Moreover, at the clutch 100, when load of greater than or equal to a predetermined value is applied to the rotor 124, due to the spring claws 182 elastically deforming, the distal end portions thereof are pulled-out from the external teeth of the rotor, and the transfer of rotation between the gear wheel 116 and the rotor 124 is cut-off. Namely, the operation of the aforementioned "load limiter mechanism" is carried out between the rotor 124 and the spring claws 182. In this case as well, load along the radial direction is not applied to the gear wheel 116. Accordingly, from this point as well, there is no need to increase the rigidity of the gear wheel 116. In this clutch 110, the gear wheel 116 can be molded to be thin-walled or can be molded of resin or the like, and compactness and weight reduction of the clutch 100 can be aimed for.

Further, at the clutch 100 of the webbing retractor 10, the ring 176 of the clutch main body portion 114 integrally has the cover portion 178, which holds the gear wheel 116, the sliders 144, the lock bars 154, the torsion coil springs 164 and the holder 170 at predetermined assembly positions, and the spring claws 182 which are for the aforementioned "load limiter mechanism". Further, the ring 176 is a structure which is held integrally with the rotor 124 by the elastic forces of the spring claws 182. Namely, at the clutch main body portion 114, due to the gear wheel 116, the sliders 144, the lock bars 154, the torsion coil springs 164, and the holder 170 being assembled at predetermined assembly positions and the ring 176 being held at the rotor 124 by the elastic forces of the spring claws 182, the aforementioned respective clutch structural members can be temporarily held (sub-assembled) integrally. In this way, the assemblability at the time of assembling the clutch main body portion 114 to the case (the clutch case 101 and the clutch cover 102), and the like, is greatly improved, and the produceability of the webbing retractor 10 improves.

Further, at the clutch 100 of the webbing retractor 10, as described above, the sliders 144 of the clutch main body portion 114 are held at the case (the clutch case 101 and the clutch cover 102) by frictional force. In this way, there is the simple structure of moving the sliders 144 and the lock bars 154 relatively, and moving the lock bars 154 to the engaged positions or positions of released engagement with the ratchet 134 by this relative movement. Accordingly, as compared with a structure, such as that of a conventional clutch, of moving a pawl by using an inertial disc which is large and heavy, the overall structure of the clutch 100 can greatly be made smaller (and thinner in particular), and the overall structure of the webbing retractor 10 can be made to be compact.

Moreover, at the clutch 100 of the webbing retractor 10, the clutch main body portion 114 is not a structure which is supported at the take-up shaft 20, and is a structure which is supported at the case (the clutch case 101 and the clutch cover 102). Namely, at the clutch main body portion 114, the spindle portion 133 provided at one axial direction side of the accommodating portion 132 of the rotor 124 is rotatably supported at the round hole 135 of the clutch cover 102 via the rotation supporting portion 175 of the holder 170, and the axial direction other side of the accommodating portion 132 is rotatably supported at the clutch case 101 via the bushing 112. Namely, it is rotatably supported at the case (the clutch case 101 and the clutch cover 102). Accordingly, in the webbing retractor 10, other than in the state (the time of a rapid deceleration of the vehicle, or the like) in which the rotor 124 and the ratchet 134 (the take-up shaft 20) are connected by the lock bars 154, the take-up shaft 20 can rotate unrelated to the clutch main body portion 114. In this way, smooth rotation of the take-up shaft 20 is guaranteed, and the ability to pull-out and take-up the webbing at times of usual use is improved.

As described above, in the webbing retractor 10 relating to the present embodiment, it is possible for only rotation from the motor 44 side to be transferred to the take-up shaft 20 by the clutch 100, and compactness and weight reduction of the clutch 100 can be aimed for, and the assemblability is improved.

Note that, in the above-described embodiment, there is a structure in which the rotation of the rotating shaft 50 of the motor 44 is transferred to the take-up shaft 20 by the clutch 100, and the take-up shaft 20 is rotated in the webbing take-up direction. However, the present invention is not limited to the same, and may be structured such that the rotation of the rotating shaft 50 of the motor 44 is transferred to the take-up shaft 20 by a clutch, and the take-up shaft 20 is rotated in the webbing pull-out direction.

INDUSTRIAL APPLICABILITY

In accordance with the present invention, because compactness and weight reduction of a clutch of a webbing retractor can be aimed for and the assemblability is improved, it can be used as a structural member which can make compact and reduce the weight of and lower the manufacturing cost of a motorized retractor which provides a tension reducer mechanism and a pretensioner mechanism.

DESCRIPTION OF THE REFERENCE NUMERALS

10 webbing retractor
20 take-up shaft
44 motor
100 clutch
101 clutch case (case)
102 clutch cover (case)
116 gear wheel
124 rotor
144 slider
154 lock bar
176 ring
178 cover portion
182 spring claw

The invention claimed is:

1. A webbing retractor comprising: a take-up shaft on which webbing for restraining a vehicle occupant is wound so as to be able to be taken-up thereon and pulled-out therefrom, a motor, and a clutch which is mechanically interposed between the motor and the take-up shaft, and transfers rotation of the motor to the take-up shaft and rotates the take-up shaft, and cuts-off transfer of rotation generated at the take-up shaft side and prevents the rotation from being transferred to the motor, wherein the clutch comprises:

a gear wheel provided coaxially to the take-up shaft, and rotating due to rotation of the motor being transferred thereto;

a rotor provided coaxially to the gear wheel;

a lock bar provided at the rotor and held at a position of released engagement with the take-up shaft, and when the rotor rotates in a first direction around an axis, the lock bar engages the take-up shaft and transfers rotation of the rotor to the take-up shaft, and when the rotor rotates in a second direction around the axis, the lock bar is moved to and held at the position of released engagement;

a ring disposed at an axial direction one side of the rotor, and holding the gear wheel and the lock bar at predetermined assembly positions; and a spring claw provided between the gear wheel and the rotor along a peripheral direction by being formed integrally with the ring, and, by elastic force of the spring claw, holding the ring at the rotor and transferring rotation of the gear wheel to the rotor, and when load of greater than or equal to a predetermined value is applied to the rotor, the spring claw cuts-off transfer of the rotation by the load, and makes the gear wheel and the rotor able to run idly relatively, and the gear wheel includes a peripheral direction load receiving portion which receives, along a peripheral direction, load applied from the spring claw.

2. The webbing retractor of claim 1, wherein the first direction is a webbing take-up direction, and the second direction is a webbing pull-out direction.

3. The webbing retractor of claim 1, wherein
   the rotor includes external teeth at an outer peripheral portion, and
   due to a distal end portion of the spring claw engaging with the external teeth of the rotor and a proximal end portion engaging with the gear wheel, the spring claw transfers rotation of the gear wheel to the rotor.

4. The webbing retractor of claim 1, wherein the clutch further comprises:
   a case; and
   a slider which can move relative to the rotor within a predetermined range by being held at the case by frictional force, and
   the lock bar is held at the position of released engagement by the slider.

5. The webbing retractor of claim 1, wherein rotation of the gear wheel is transferred to the rotor due to a proximal end portion of the spring claw abutting the peripheral direction load receiving portion of the gear wheel.

6. The webbing retractor of claim 1, wherein the clutch further comprises:
   a spring urging the lock bar in a direction of engaging with the take-up shaft; and
   a holder restricting axial direction displacement of the lock bar with respect to the rotor, and the ring holds the gear wheel, the slider, the lock bar, the spring, and the holder at predetermined assembly positions.

7. The webbing retractor of claim 1, wherein the gear wheel is formed of resin.

8. The webbing retractor of claim 3, wherein the spring claw is formed in a shape of a plate having elasticity, and when load of greater than or equal to predetermined value is applied to the rotor, due to the spring claw elastically deforming due to the load and pulling-out the distal end portion from the external teeth of the rotor, the spring claw makes the gear wheel and the rotor able to run idly relatively.

9. The webbing retractor of claim 4, wherein the lock bar is always urged in a direction of engaging with the take-up shaft, and when the rotor rotates in the first direction, the lock bar moves so as to move apart from the slider and the holding is released and the lock bar engages with the take-up shaft by the urging force, and when the rotor rotates in the second direction, the lock bar moves so as to approach the slider and is moved to and held at the position of released engagement by the slider.

10. A webbing retractor comprising: a take-up shaft on which webbing for restraining a vehicle occupant is wound so as to be able to be taken-up thereon and pulled-out therefrom, a motor, and a clutch which is mechanically interposed between the motor and the take-up shaft, and transfers rotation of the motor to the take-up shaft and rotates the take-up shaft in the webbing take-up direction, and cuts-off transfer of rotation generated at the take-up shaft side and prevents the rotation from being transferred to the motor, wherein the clutch comprises:
a case;
a gear wheel provided coaxially to the take-up shaft, and rotating due to rotation of the motor being transferred thereto;
a rotor provided coaxially to the gear wheel, and having external teeth at an outer peripheral portion;
a slider which can move relative to the rotor within a predetermined range by being held at the case by frictional force;
a lock bar provided at the rotor, and always urged in a direction of engaging with the take-up shaft, and held by the slider at a position of released engagement with the take-up shaft, and when the rotor rotates in the webbing take-up direction, the lock bar moves so as to move apart from the slider, and the holding is released, and the lock bar engages with the take-up shaft due to the urging force, and transfers rotation of the rotor to the take-up shaft, and permits relative rotation of the take-up shaft in the webbing take-up direction with respect to the rotor, and when the rotor rotates in the webbing pull-out direction, the lock bar moves so as to approach the slider, and is moved to and held at the position of released engagement by the slider;
a ring disposed at an axial direction one side of the rotor, and holding the gear wheel and the lock bar at predetermined assembly positions; and
a spring claw formed in a shape of a plate having elasticity, and provided between the gear wheel and the rotor along a peripheral direction by being formed integrally with the ring, and holding the ring at the rotor by elastic force of the spring claw, and a distal end portion of the spring claw engages with the external teeth of the rotor, and a proximal end portion of the spring claw engages with the gear wheel, and the spring claw transfers rotation of the gear wheel to the rotor, and when load of greater than or equal to a predetermined value is applied to the rotor, the spring claw elastically deforms due to the load, and pulls-out the distal end portion from the external teeth, and makes the gear wheel and the rotor able to run idly relatively, and
the gear wheel includes a peripheral direction load receiving portion which receives, along a peripheral direction, load applied from the spring claw.

11. The webbing retractor of claim 10, wherein the clutch further comprises:
a spring urging the lock bar in a direction of engaging with the take-up shaft; and
a holder restricting axial direction displacement of the lock bar with respect to the rotor, and
the ring holds the gear wheel, the slider, the lock bar, the spring, and the holder at predetermined assembly positions.

12. The webbing retractor of claim 10, wherein rotation of the gear wheel is transferred to the rotor due to a proximal end portion of the spring claw abutting the peripheral direction load receiving portion of the gear wheel.

13. The webbing retractor of claim 10, wherein the gear wheel is formed of resin.

14. A webbing retractor comprising: a take-up shaft on which webbing for restraining a vehicle occupant is wound so as to be able to be taken-up thereon and pulled-out therefrom, a motor, and a clutch which is mechanically interposed between the motor and the take-up shaft, and transfers rotation of the motor to the take-up shaft and rotates the take-up shaft, and cuts-off transfer of rotation generated at the take-up shaft side and prevents the rotation from being transferred to the motor, wherein the clutch comprises:
a gear wheel provided coaxially to the take-up shaft, and rotating due to rotation of the motor being transferred thereto;
a rotor provided coaxially to the gear wheel;
a lock bar provided at the rotor and held at a position of released engagement with the take-up shaft, and when the rotor rotates in a first direction around an axis, the lock bar engages the take-up shaft and transfers rotation of the rotor to the take-up shaft, and when the rotor rotates in a second direction around the axis, the lock bar is moved to and held at the position of released engagement; and
a ring including a cover portion disposed at an axial direction one side of the rotor and holding the gear wheel and the lock bar at predetermined assembly positions, and a spring claw formed integrally with the cover portion and provided between the gear wheel and the rotor and transferring rotation of the gear wheel to the rotor, and when load of greater than or equal to a predetermined value is applied to the rotor, the spring claw cuts-off transfer of the rotation by the load and makes the gear wheel and rotor able to run idly relatively, and the ring is held at the rotor by elastic force of the spring claw.

15. The webbing retractor of claim 14, wherein the gear wheel including a peripheral direction load receiving portion which receives, along a peripheral direction, load applied from the spring claw.

16. The webbing retractor of claim 14, wherein the first direction is a webbing take-up direction, and the second direction is a webbing pull-out direction.

17. The webbing retractor of claim 14, wherein
the rotor includes external teeth at an outer peripheral portion, and
due to a distal end portion of the spring claw engaging with the external teeth of the rotor and a proximal end portion engaging with the gear wheel, the spring claw transfers rotation of the gear wheel to the rotor.

18. The webbing retractor of claim 14, wherein the clutch further comprises:
   a case;
   a slider which can move relative to the rotor within a predetermined range by being held at the case by frictional force;
   a spring urging the lock bar in a direction of engaging with the take-up shaft; and
   a holder restricting axial direction displacement of the lock bar with respect to the rotor, and
   the ring holds the gear wheel, the slider, the lock bar, the spring, and the holder at predetermined assembly positions.

19. The webbing retractor of claim 14, wherein the gear wheel is formed of resin.

20. The webbing retractor of claim 15, wherein rotation of the gear wheel is transferred to the rotor due to a proximal end portion of the spring claw abutting the peripheral direction load receiving portion of the gear wheel.

21. The webbing retractor of claim 17, wherein, when load of greater than or equal to a predetermined value is applied to the rotor, due to the spring claw elastically deforming due to the load and pulling-out the distal end portion from the external teeth of the rotor, the spring claw makes the gear wheel and the rotor able to run idly relatively.

22. A webbing retractor comprising: a take-up shaft on which webbing for restraining a vehicle occupant is wound so as to be able to be taken-up thereon and pulled-out therefrom, a motor, and a clutch which is mechanically interposed between the motor and the take-up shaft, and transfers rotation of the motor to the take-up shaft and rotates the take-up shaft in the webbing take-up direction, and cuts-off transfer of rotation generated at the take-up shaft side and prevents the rotation from being transferred to the motor, wherein the clutch comprises:
   a case;
   a gear wheel provided coaxially to the take-up shaft, and rotating due to rotation of the motor being transferred thereto;
   a rotor provided coaxially to the gear wheel;
   a slider which can move relative to the rotor within a predetermined range by being held
   at the case by frictional force;
   a lock bar provided at the rotor, and always urged in a direction of engaging with the take-up shaft, and held by the slider at a position of released engagement with the take-up shaft, and when the rotor rotates in the webbing take-up direction, the lock bar moves so as to move apart from the slider, and the holding is released, and the lock bar engages with the take-up shaft due to the urging force, and transfers rotation of the rotor to the take-up shaft, and permits relative rotation of the take-up shaft in the webbing take-up direction with respect to the rotor, and when the rotor rotates in the webbing pull-out direction, the lock bar moves so as to approach the slider, and is moved to and held at the position of released engagement by the slider; and
   a ring including a cover portion disposed at an axial direction one side of the rotor and holding the gear wheel, the slider and the lock bar at predetermined assembly positions, and a spring claw formed integrally with the cover portion and provided between the gear wheel and the rotor and transferring rotation of the gear wheel to the rotor, and when load of greater than or equal to a predetermined value is applied to the rotor, the spring claw cuts-off transfer of the rotation by the load and makes the gear wheel and the rotor able to run idly relatively, and the ring is held at the rotor by elastic force of the spring claw.

23. The webbing retractor of claim 22, wherein the gear wheel includes a peripheral direction load receiving portion which receives, along a peripheral direction, load applied from the spring claw.

24. The webbing retractor of claim 22, wherein the clutch further comprises:
   a spring urging the lock bar in a direction of engaging with the take-up shaft; and
   a holder restricting axial direction displacement of the lock bar with respect to the rotor, and
   the ring holds the gear wheel, the slider, the lock bar, the spring, and the holder at predetermined assembly positions.

25. The webbing retractor of claim 22, wherein the gear wheel is formed of resin.

26. The webbing retractor of claim 23, wherein rotation of the gear wheel is transferred to the rotor due to a proximal end portion of the spring claw abutting the peripheral direction load receiving portion of the gear wheel.

* * * * *